(12) United States Patent
Kawabuchi et al.

(10) Patent No.: US 8,325,191 B2
(45) Date of Patent: Dec. 4, 2012

(54) IMAGE DISTRIBUTION APPARATUS, IMAGE DISTRIBUTION METHOD, AND IMAGE DISTRIBUTION PROGRAM

(75) Inventors: Yoichi Kawabuchi, Itami (JP); Akemi Morita, Nishinomiya (JP); Junichi Hase, Osaka (JP); Keisuke Teramoto, Itami (JP); Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 861 days.

(21) Appl. No.: 12/364,713

(22) Filed: Feb. 3, 2009

(65) Prior Publication Data

US 2009/0195546 A1    Aug. 6, 2009

(30) Foreign Application Priority Data

Feb. 5, 2008  (JP) ................. 2008-025481
Oct. 29, 2008  (JP) ................. 2008-278855

(51) Int. Cl.
G06T 15/70 (2006.01)
(52) U.S. Cl. ........ 345/473; 358/1.15; 725/112; 725/114
(58) Field of Classification Search .................. 345/473; 725/112, 114; 358/1.15
See application file for complete search history.

(56) References Cited

U.S. PATENT DOCUMENTS

| | | | |
|---|---|---|---|
| 2004/0031058 A1* | 2/2004 | Reisman | 725/112 |
| 2005/0243871 A1* | 11/2005 | Tanimoto | 370/522 |
| 2007/0188594 A1 | 8/2007 | Yoshino | |
| 2007/0300232 A1* | 12/2007 | Marriott et al. | 719/311 |
| 2008/0177630 A1* | 7/2008 | Maghfourian et al. | 705/14 |
| 2008/0235747 A1* | 9/2008 | Choi | 725/114 |
| 2009/0288128 A1* | 11/2009 | Oida et al. | 725/112 |

FOREIGN PATENT DOCUMENTS

| | | |
|---|---|---|
| EP | 1 427 205 A1 | 6/2004 |
| JP | 9-091188 A | 4/1997 |
| JP | 2001-157034 A | 6/2001 |
| JP | 2003-264816 | 9/2003 |
| JP | 2004-208210 | 7/2004 |
| JP | 2005-277847 | 10/2005 |
| JP | 2006-203399 | 8/2006 |
| JP | 2006-304163 | 11/2006 |
| JP | 2007-208458 | 8/2007 |
| WO | WO 02/23350 A1 | 3/2002 |

OTHER PUBLICATIONS

Notice of Ground of Rejection issued in the corresponding Japanese Patent Application No. 2008-278855 dated Feb. 2, 2010, and an English Translation thereof.
Office Action (Notice of Ground of Rejection) dated Nov. 30, 2010, issued in the corresponding Japanese Patent Application No. 2008-278855, and an English Translation thereof.

* cited by examiner

Primary Examiner — Kimbinh T Nguyen
(74) Attorney, Agent, or Firm — Buchanan Ingersoll & Rooney PC

(57) ABSTRACT

In order to prevent a duplicate of a still image from being generated, an MFP includes an image obtaining portion to obtain one or more still images, a moving image generating portion to generate a moving image in which the obtained still images are displayed sequentially, and a distribution portion to perform real-time streaming distribution of the moving image in response to a request from a PC connected to a network.

20 Claims, 15 Drawing Sheets

MOVING IMAGE RECORD

| MOVING IMAGE FILE NAME | STILL IMAGE FILE NAME |
|---|---|

F I G. 1 4

| STILL IMAGE FILE NAME | INSERTING POSITION | URL OF MOVING IMAGE DATA |
|---|---|---|
| Document1.pdf | 1 | http://WWW.yyydoga.com/xxxxx. |
| | 5 | http://WWW.yyydoga.com/xxxxy |
| Document2.pdf | 3 | http://WWW.yyydoga.com/yyyyy |
| | 6 | http://WWW.yyydoga.com/yyyyz |

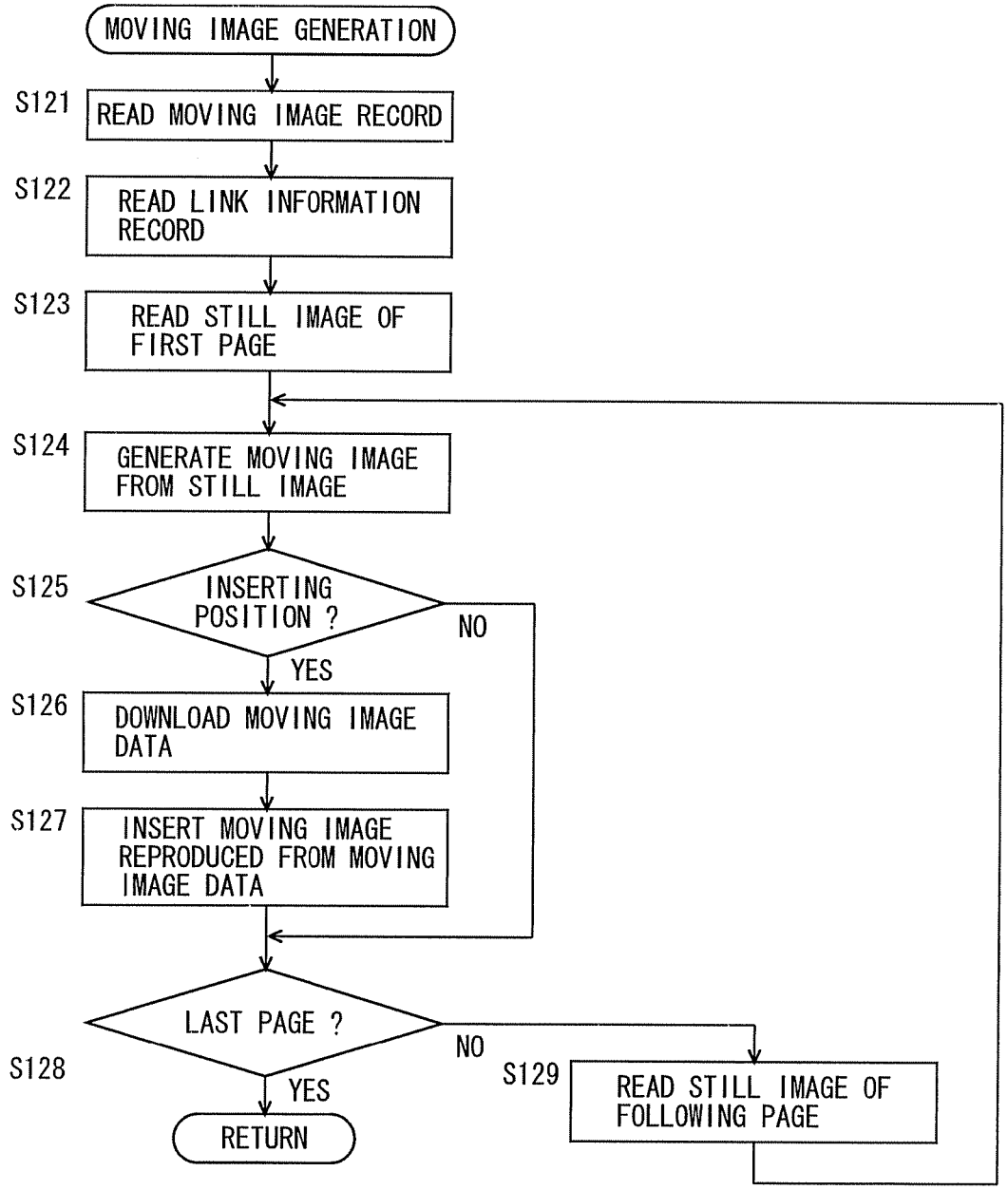

IMAGE DISTRIBUTION APPARATUS, IMAGE DISTRIBUTION METHOD, AND IMAGE DISTRIBUTION PROGRAM

This application is based on Japanese Patent Applications No. 2008-25481 and No. 2008-278855 filed with Japan Patent Office on Feb. 5, 2008 and on Oct. 29, 2008, respectively, the entire content of which is hereby incorporated by reference.

BACKGROUND OF THE INVENTION

1. Field of the Invention

The present invention relates to an image distribution apparatus, an image distribution method, and an image distribution program. More particularly, the present invention relates to an image distribution apparatus, an image distribution method, and an image distribution program which are suitable for distributing an image containing sensitive information.

2. Description of the Related Art

In recent years, a multi-function peripheral (hereinafter, referred to as the "MFP") has a mass storage such as a hard disk drive (HDD) installed therein to store a large amount of data. The MFP is connected to a network, and the data stored in the HDD may be viewed from a personal computer (hereinafter, referred to as the "PC") connected to the network. However, there is a case where it is desired to restrict transmission of the data containing sensitive information. There is also a case where it is desired to prevent the transmitted data from being stored in the PC, because confidentiality of the data cannot be preserved if a duplicate of the transmitted data is stored in the PC.

For example, Japanese Patent Application Laid-Open No. 2001-157034 discloses an image processor which allows time-limit management of a distributed image on a receiver-side device. This, however, requires installation of a dedicated program to the receiver-side device, resulting in a large-scale system.

SUMMARY OF THE INVENTION

The present invention has been accomplished in view of the foregoing problems, and an object of the present invention is to provide an image distribution apparatus which prevents duplication of a still image.

Another object of the present invention is to provide an image distribution method which prevents duplication of a still image.

A further object of the present invention is to provide an image distribution program which prevents duplication of a still image.

In order to achieve the above-described objects, according to an aspect of the present invention, an image distribution apparatus includes: an image obtaining portion to obtain one or more still images; a moving image generating portion to generate a moving image in which the obtained one or more still images are sequentially displayed; and a distribution portion to perform real-time streaming distribution of the generated moving image in response to a request from a computer connected to a network.

According to another aspect of the present invention, an image distribution method includes the steps of: obtaining one or more still images; generating a moving image in which the obtained one or more still images are sequentially displayed; and in response to a request from a computer connected to a network, performing real-time streaming distribution of the generated moving image.

According to a further aspect of the present invention, an image distribution program embodied on a computer readable medium causes a computer to carry out the steps of: obtaining one or more still images; generating a moving image in which the obtained one or more still images are sequentially displayed; and in response to a request from a computer connected to a network, performing real-time streaming distribution of the generated moving image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows an example of a link information table.

FIG. 18 is a flowchart illustrating an example of the flow of moving image generation processing.

DESCRIPTION OF THE PREFERRED EMBODIMENTS

Figure 1:
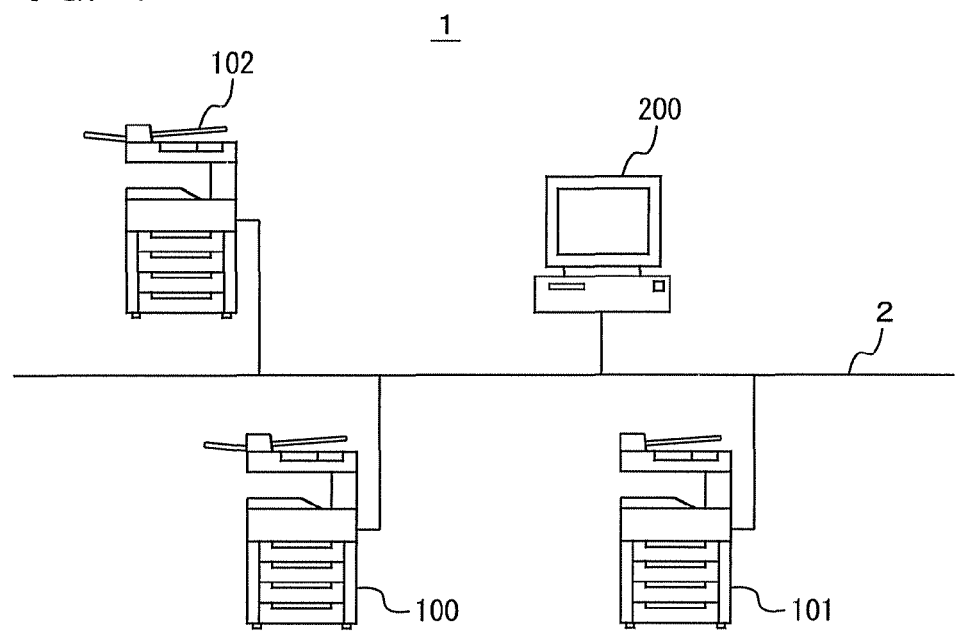
FIG. 1 schematically shows an image distribution system according to an embodiment of the present invention.

Embodiments of the present invention will now be described with reference to the drawings. In the following description, like reference characters denote like members, which have like names and functions, and therefore, detailed description thereof will not be repeated.

FIG. 1 schematically shows an image distribution system according to an embodiment of the present invention. Referring to FIG. 1, an image distribution system 1 includes MFPs (Multi-Function Peripherals) 100, 101, and 102 each serving as an image distribution apparatus, and a PC (Personal Computer) 200 receiving a distributed image, which are connected to a network 2.

Network 2 is a local area network (LAN), which is connected to the Internet via a gateway. Network 2 may be connected in a wired or wireless manner. Network 2 is not necessarily the LAN; it may be a network using public switched telephone networks (PSTN), a wide area network (WAN), the Internet, and the like.

PC 200 is a typical computer, which has installed therein a browsing program for downloading a Web page stored in a Web server, and a moving image reproduction program for decoding moving image data to reproduce a moving image.

Each of MFPs 100, 101, and 102 includes a scanner device for reading an original, and an image forming device and a facsimile device for forming an image on a recording medium such as a sheet of paper based on image data, and has the image reading function, copying function, and facsimile transmitting/receiving function. Further, each of MFPs 100, 101, and 102 has installed therein programs for serving as a Web server and a streaming distribution server. While MFPs 100, 101, and 102 are described in the present embodiment, not limited thereto, the image distribution apparatus may be a printer, facsimile machine, personal computer, or other device capable of recording still images. Because MFPs 100, 101, and 102 are identical in configuration and function, MFP 100 will be described representatively in the following, unless otherwise stated.

Figure 2:
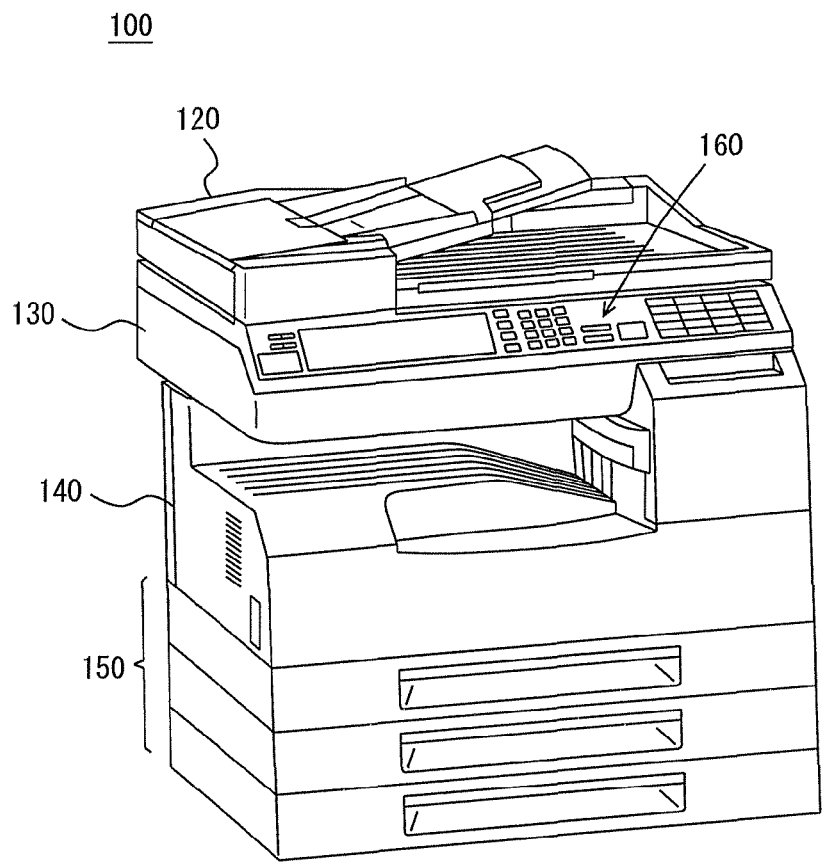
FIG. 2 is a perspective view of an MFP.
Figure 3:
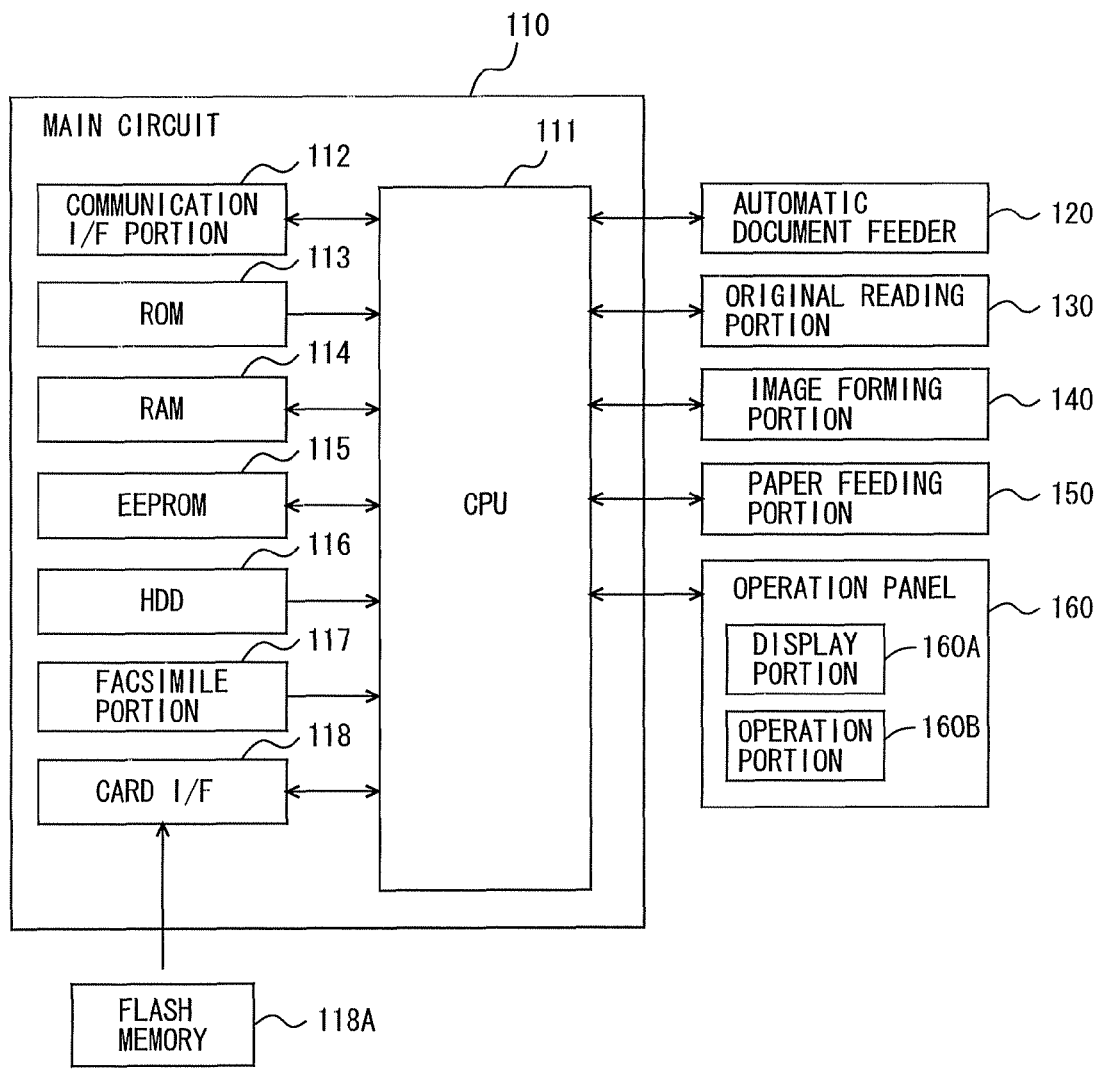
FIG. 3 is a block diagram showing an example of the hardware configuration of the MFP.

FIG. 2 is a perspective view of the MFP, and FIG. 3 is a block diagram showing an example of the hardware configuration of the MFP. Referring to FIGS. 2 and 3, MFP 100 includes: a main circuit 110; an original reading portion 130 which reads an original; an automatic document feeder 120 which delivers an original to original reading portion 130; an image forming portion 140 which forms, on a sheet of paper or the like, a still image output from original reading portion 130 that read an original; a paper feeding portion 150 which supplies sheets of paper to image forming portion 140; and an operation panel 160 which serves as a user interface. Main circuit 110 includes a central processing unit (CPU) 111, a communication interface (I/F) portion 112, a ROM (Read Only Memory) 113, a RAM (Random Access Memory) 114, an EEPROM (Electronically Erasable and Programmable ROM) 115, a hard disk drive (HDD) 116 as a mass storage, a facsimile portion 117, and a card interface (I/F) 118 mounted with a flash memory 118A. CPU 111 is connected with automatic document feeder 120, original reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores still images consecutively transmitted from original reading portion 130.

Operation panel 160 is provided on an upper surface of MFP 100, and includes a display portion 160A and an operation portion 160B. Display portion 160A is a display such as a liquid crystal display (LCD) or an organic electro-luminescence display (ELD), and displays an instruction menu for the user, information about acquired image data, and others. Operation portion 160B is provided with a plurality of keys, and accepts input of data such as instructions, characters, and numerical characters, according to the key operations of the user. Operation portion 160B further includes a touch panel provided on display portion 160A.

Communication I/F portion 112 is an interface for connecting MFP 100 to network 2. CPU 111 communicates with MFPs 101, 102, and PC 200, via communication I/F portion 112, for transmission/reception of data. Further, communication I/F portion 112 is capable of communicating with a computer connected to the Internet via network 2. Communication I/F portion 112 also transmits/receives e-mail to/from the PC.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits it to a facsimile machine connected to the PSTN.

Card I/F 118 is mounted with flash memory 118A. CPU 111 is capable of accessing flash memory 118A via card I/F 118. CPU 111 loads a program recorded on flash memory 118A mounted to card I/F 118, to RAM 114 for execution. It is noted that the program executed by CPU 111 is not restricted to the program recorded on flash memory 118A. CPU 111 may load a program stored in HDD 116 to RAM 114 for execution. In this case, another computer connected to network 2 may rewrite the program stored in HDD 116 of MFP 100 or may additionally write a new program. Further, MFP 100 may download a program from another computer connected to network 2, and store the program in HDD 116. As used herein, the "program" includes, not only the program directly executable by CPU 111, but also a source program, a compressed program, an encrypted program, and others.

Figure 4:
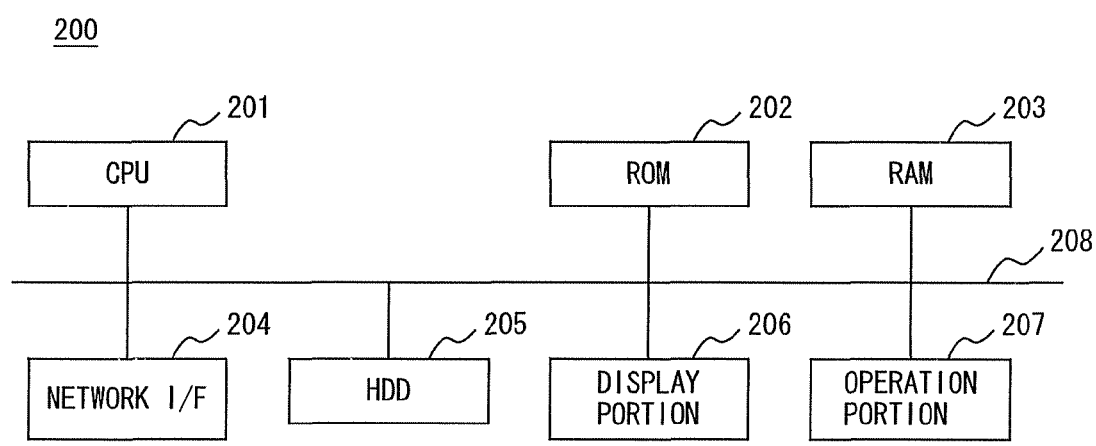
FIG. 4 is a block diagram showing an example of the hardware configuration of a PC.

FIG. 4 is a block diagram showing an example of the hardware configuration of the PC. Referring to FIG. 4, PC 200 includes: a CPU 201 which is responsible for overall control of PC 200; a ROM 202 which stores a program to be executed by CPU 201 or the like; a RAM 203 used as a work area for CPU 201; a network I/F 204 which connects PC 200 to the network; an HDD 205 as a mass storage; a display portion 206; and an operation portion 207 which accepts an input of a user's operation; which are each connected to a bus 208.

Figure 5:
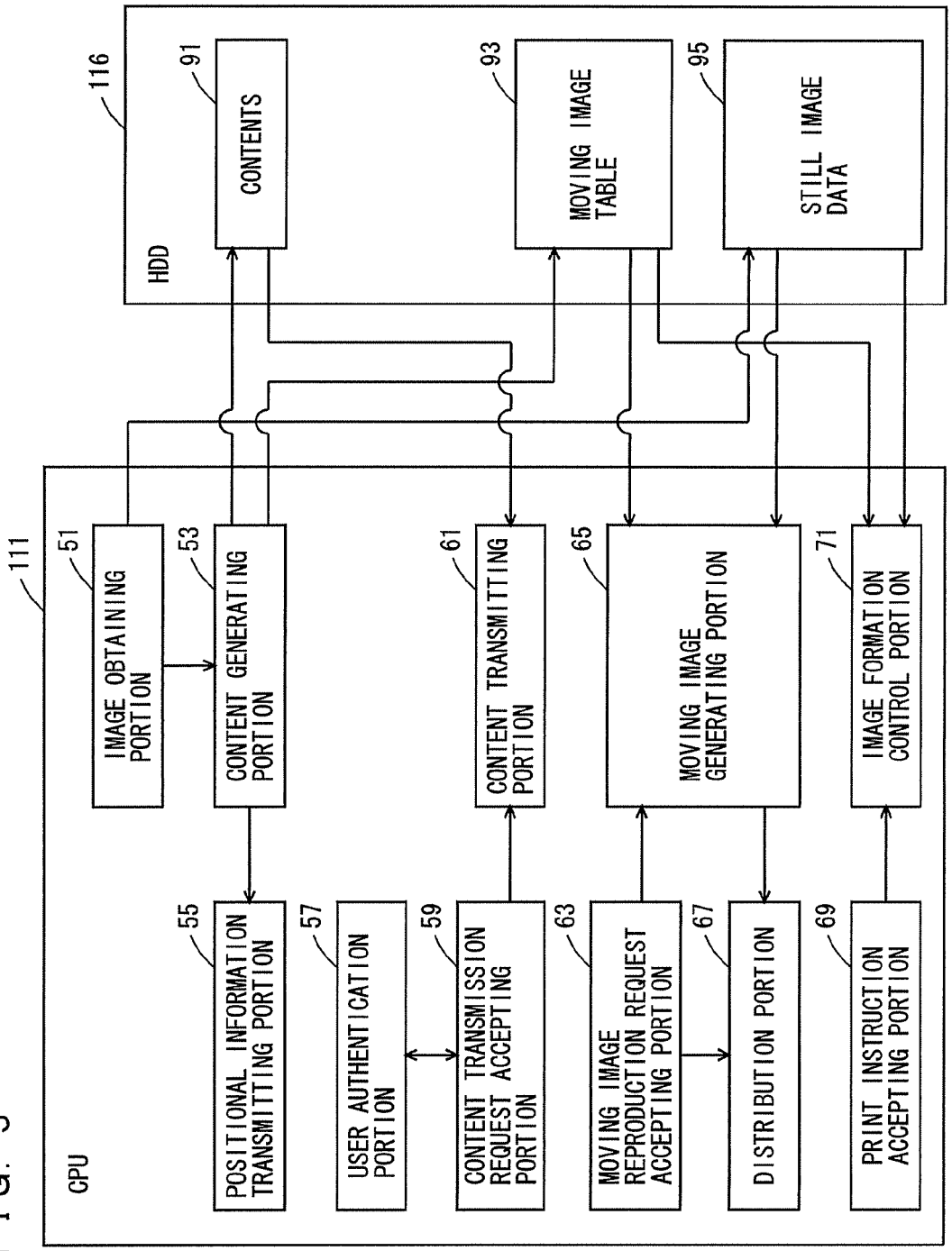
FIG. 5 is a functional block diagram showing an example of the functions of a CPU included in the MFP, together with data stored in an HDD.

FIG. 5 is a functional block diagram showing an example of the functions of the CPU included in the MFP, together with data stored in the HDD. Referring to FIG. 5, CPU 111 included in MFP 100 includes: an image obtaining portion 51 which obtains still images; a content generating portion 53 which generates a content including a Web page; a positional information transmitting portion 55 which transmits positional information of a Web page on network 2; a content transmission request accepting portion 59 which accepts a content transmission request; a user authentication portion 57 for authentication of the user who has requested transmission of a content; a content transmitting portion 61 which transmits a content; a moving image reproduction request accepting portion 63 which accepts a moving image reproduction request; a moving image generating portion 65 which generates a moving image from a still image; a distribution portion 67 which distributes a moving image; a print instruction accepting portion 69 which accepts a print instruction; and an image formation control portion 71 which forms a still image on a sheet of paper.

Image obtaining portion 51 obtains and stores a still image in HDD 116 as still image data 95, and outputs identification information for identification of the stored still image data to content generating portion 53. As a result, still image data 95 is stored in the HDD. The identification information includes positional information indicating where in HDD 116 still image data 95 is stored. In the case of obtaining a plurality of still images as a set, image obtaining portion 51 stores them as a block of still image data 95 in HDD 116, and outputs the identification information for identification of that still image data 95 to content generating portion 53. The still image data has a file name which includes an absolute path indicating the position in HDD 116 where the data is stored. Although the position for storing still image data 95 is not particularly restricted, if it is configured to store still image data 95 in a predetermined area in HDD 116, the event that the still image data is stored in the predetermined area may serve as a trigger to distribute still image data 95 as a moving image.

More specifically, in the case where the user inputs an instruction to read an original to operation portion 160B, image obtaining portion 51 receives the original reading instruction from operation portion 160B. In receipt of the original reading instruction, image obtaining portion 51 causes original reading portion 130 to read an image of the original, and obtains from original reading portion 130 a still image that original reading portion 130 outputs by reading the image of the original. In the case where original reading portion 130 reads a plurality of originals, image obtaining portion 51 obtains a plurality of still images.

Further, image obtaining portion 51 displays file names of still image data 95 stored in HDD 116. When the user inputs to operation portion 160B an instruction to select any of the displayed file names, image obtaining portion 51 receives the selected file name from operation portion 160B. Image obtaining portion 51 obtains still image data 95 having the selected file name from HDD 116. Image obtaining portion 51 then outputs identification information for identification of the obtained still image data 95 to content generating portion 53. In the case where the user selects a plurality of file names, image obtaining portion 51 obtains a plurality of pieces of still image data 95. It then stores the obtained still image data together as a block of still image data 95 in HDD 116, and outputs identification information for identification of that still image data 95 to content generating portion 53.

In the case where communication I/F portion 112 receives print data from a PC connected to network 2, image obtaining portion 51 obtains from communication I/F portion 112 the print data that communication I/F portion 112 has received from the PC. Image obtaining portion 51 converts the print data obtained from communication I/F portion 112 to a still image, and stores it as still image data 95 in HDD 116, and also outputs identification information for identification of the stored still image data 95 to content generating portion 53. As a result, still image data 95 is stored in the HDD. In the case where the obtained print data includes a plurality of pages, image obtaining portion 51 converts the pages included in the print data respectively to still images. It then stores the converted still images together as a block of still image data 95 in HDD 116, and outputs identification information for identification of that still image data 95 to content generating portion 53.

Further, in the case where communication I/F portion 112 receives a still image from a PC connected to network 2 in accordance with a communication protocol such as FTP (File Transfer Protocol) or SMB (Server Message Block), image obtaining portion 51 stores the still image that communication I/F portion 112 has received from the PC as still image data 95 in HDD 116, and also outputs identification information for identification of the stored still image data 95 to content generating portion 53. In the case where a plurality of still images are obtained, image obtaining portion 51 stores the obtained still images together as a block of still image data 95 in HDD 116, and outputs identification information for identification of that still image data 95 to content generating portion 53.

Content generating portion 53 generates a content based on the identification information input from image obtaining portion 51, and stores the generated content in HDD 116. The content includes a command to reproduce a moving image, which will be described later. By way of example, the content may include a Web page and a metafile. The metafile is described in a markup language, and includes a command to distribute a moving image in real time. The command included in the metafile includes positional information of a moving image file on network 2, which will be described later. The command is for example the one to communicate in accordance with a communication protocol such as RTSP (Real Time Streaming Protocol) or MMS (Microsoft Media Server). The positional information indicates the position of the moving image file on the network, and includes an IP (Internet Protocol) address assigned to MFP 100 and an absolute path to the metafile in HDD 116 where the metafile is stored. Here, a URL (Uniform Resource Locator) is used therefor. Content generating portion 53 stores the generated metafile in HDD 116.

Next, content generating portion 53 generates and stores a Web page in HDD 116. The Web page includes positional information (URL) of the metafile on network 2. When the Web page is displayed on PC 200 with a browser program installed therein, PC 200 is able to download the metafile from MFP 100 based on the URL of the metafile. The processing in the case where PC 200 downloads the metafile will be described later in detail. The Web page further includes a command to accept a print instruction and a command to return the print instruction.

Figures 6, 7:
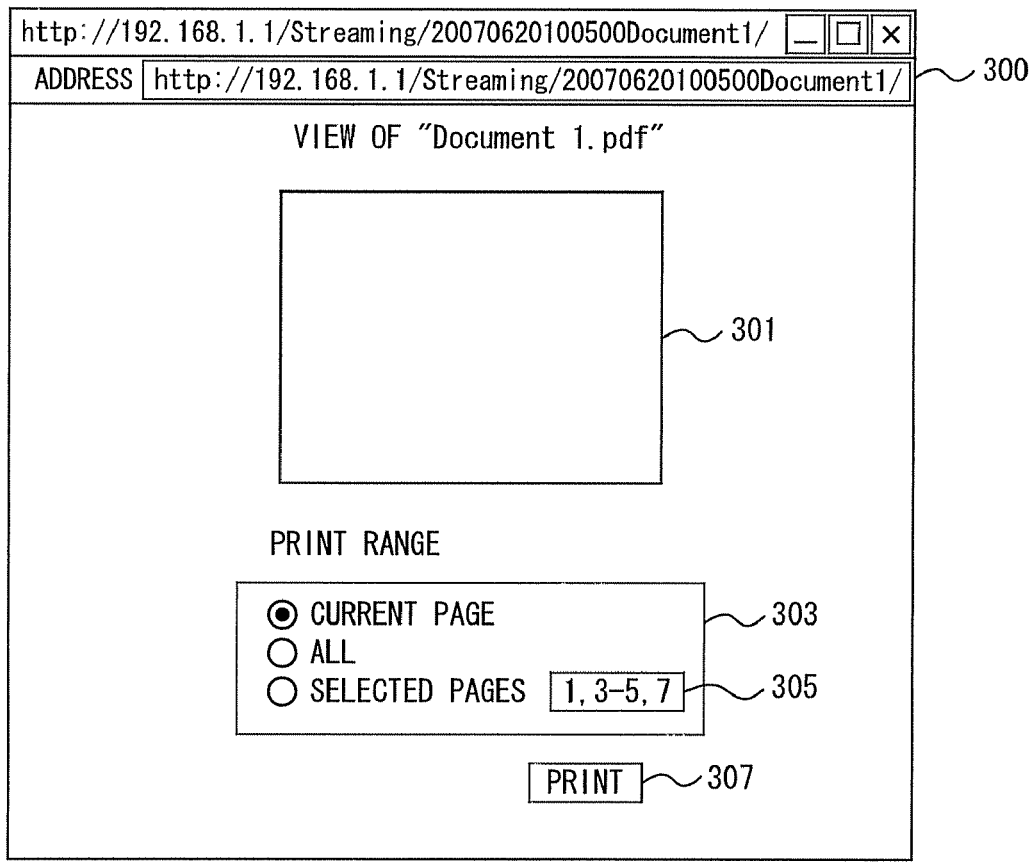
FIG. 6 shows an example of a moving image record included in a moving image table.
FIG. 7 shows an example of a Web page screen.

Further, content generating portion 53 generates a moving image record, and stores it additionally in a moving image table 93 stored in HDD 116. FIG. 6 shows an example of the moving image record included in the moving image table. Referring to FIG. 6, the moving image record includes a file name of a moving image and a file name of still image data 95 that is input from image obtaining portion 51, which are associated with each other. One moving image record is generated every time image obtaining portion 51 obtains a still image, and is added to moving image table 93. The moving image file name is information for identification of the moving image that is generated by a moving image generating portion 65, which will be described later. A file name is used as the identification information here. The moving image file name includes an absolute path in HDD 116. The still image file name is information for identification of still image data 95 that is obtained by image obtaining portion 51 and stored in HDD 116. A file name is used as the identification information here.

Returning to FIG. 5, positional information transmitting portion 55 transmits a URL of the Web page generated by content generating portion 53. The URL may be transmitted to a predetermined destination, or image obtaining portion 51 may obtain the destination together with the still image. For example, in the case where the user inputs an instruction to read an original to operation portion 160B, positional information transmitting portion 55 accepts from operation portion 160B the information about the destination that the user has input to operation portion 160B. In the case where communication I/F portion 112 receives print data or a still image from a PC connected to network 2, positional information transmitting portion 55 obtains from communication I/F portion 112 the information about the destination that is received together with the print data or the still image. Here, e-mail including the URL and having the e-mail address specified by the information about the destination is generated, and the generated e-mail is transmitted to an electronic mail server. In the following, it is assumed that a user assigned with an e-mail address operates PC 200 to receive e-mail. While the URL is transmitted via e-mail in this example, the URL may be transmitted via another communication method, FTP for example.

When the e-mail transmitted from MFP 100 is received by and displayed on PC 200, the URL of the Web page is displayed. When the user operating PC 200 designates the URL, PC 200 executes a browser program and transmits a content transmission request requesting transmission of the Web page to MFP 100. The content transmission request may be, e.g., a GET command, which includes the URL, of the Web page.

MFP 100 serves as a Web server. When communication I/F portion 112 receives the content transmission request, content transmission request accepting portion 59 accepts from communication I/F portion 112 the content transmission request as well as the IP address of PC 200 that issued the request. Content transmission request accepting portion 59 firstly outputs the IP address of PC 200 to user authentication portion 57 and, on the condition that user authentication portion 57 succeeds in authentication, outputs the content transmission request and the IP address of PC 200 to content transmitting portion 61.

User authentication portion 57, based on the IP address input from content transmission request accepting portion 59, transmits an authentication Web page requesting log-in to PC 200. The authentication Web page has an area for receiving input of a password as authentication information, and includes a command to transmit the password input to the area to MFP 100. When the user of PC 200 inputs a password to operation portion 207 in PC 200, PC 200 transmits the password via network I/F 204 to MFP 100. The password transmitted from PC 200 is received by communication I/F portion 112 in MFP 100, and user authentication portion 57 accepts the password from communication I/F portion 112. If the accepted password matches a predetermined password, user authentication portion 57 determines that the authentication succeeded. If not, it determines that the authentication failed. When determining that the authentication is successful, user authentication portion 57 outputs a signal indicating success in authentication to content transmission request accepting portion 59. Upon success in authentication, user authentication portion 57 also establishes a communication session with PC 200. The session is continued for a predetermined period of time or until a signal instructing disconnection of the session is received from PC 200.

To request a different password from a different user, predetermined passwords may be stored in HDD 116 in association with respective users. This ensures a higher level of security for the still images. Alternatively, passwords may be stored in association with the Web pages stored in HDD 116. For example, it may be configured such that image obtaining portion 51 accepts a password at the time point when it obtains a still image, and the password may be stored in association with the Web page generated by content generating portion 53. This ensures that only the user who has input the still image to MFP 100 knows the password. Still alternatively, a password may be generated when positional information transmitting portion 55 transmits a URL of the Web page, and the password may be stored in association with the Web page and transmitted together with the URL of the Web page. This ensures that only the person who has received the e-mail knows the password.

In the case where the password is stored in association with the Web page stored in HDD 116, user authentication portion 57 accepts the URL together with the IP address from content transmission request accepting portion 59, and compares the password stored in association with the Web page specified by the accepted URL with the password accepted from communication I/F portion 112.

In receipt of the URL and the IP address from content transmission request accepting portion 59, content transmitting portion 61 reads the Web page specified by the URL from HDD 116, and transmits the Web page via communication I/F portion 112 to PC 200 based on the IP address.

In PC 200 which receives the Web page, the browser program is executed, whereby the Web page is displayed on display portion 206.

FIG. 7 shows an example of the Web page screen. Referring to FIG. 7, the Web page screen 300 displayed on PC 200 includes: an area 301 in which a moving image is displayed; an area 303 to which a print instruction is input; and a button 307 having the characters "PRINT" thereon. In area 301, the moving image is displayed as CPU 201 executes a moving image reproduction program.

Area 301 is linked with the URL of the metafile included in the Web page. When a reproduction button included in area 301 is designated via operation portion 207, a signal including the URL of the metafile and requesting transmission of the metafile is transmitted via network I/F 204 to MFP 100. The signal requesting transmission of the metafile constitutes part of a signal requesting real-time streaming distribution. Area 303, to which a print instruction is input, will be described later.

While the Web page described here is of a so-called embedded type, wherein Web page screen 300 displayed by the browser program contains therein the area 301 including the screen for displaying the moving image reproduced by the moving image reproduction program, not limited thereto, the Web page may be of a so-called pop-up type, in which case the moving image reproduction program displays a screen different from the one in which the Web page is displayed by the browser program, to reproduce the moving image therein.

Returning to FIG. 5, in MFP 100, when communication I/F portion 112 receives a signal requesting transmission of the metafile from PC 200, moving image reproduction request accepting portion 63 accepts the signal requesting transmission of the metafile and the IP address of PC 200 that issued the signal from communication I/F portion 112. On the condition that the session is established with PC 200, moving image reproduction request accepting portion 63 reads from HDD 116 the metafile specified by the URL included in the metafile transmission requesting signal, and transmits the metafile to PC 200 based on the IP address accepted from communication I/F portion 112.

In PC 200 which has received the metafile, the moving image reproduction program is being executed. PC 200 transmits a moving image reproduction requesting signal to MFP 100 via network I/F 204. The moving image reproduction requesting signal constitutes part of the signal requesting real-time streaming distribution, and includes a command included in the metafile.

In MFP 100, the moving image reproduction requesting signal transmitted from PC 200 is received by communication I/F portion 112. MFP 100 serves as a moving image distribution server, and when communication I/F portion 112 receives the moving image reproduction requesting signal, moving image reproduction request accepting portion 63 accepts from communication I/F portion 112 the moving image reproduction requesting signal as well as the IP address of PC 200 that issued the signal. The moving image reproduction requesting signal is a command to distribute a moving image in real time, and includes the URL of the moving image file. On the condition that a session is established with PC 200, moving image reproduction request accepting portion 63 outputs the URL of the moving image file to moving image generating portion 65, and also outputs the URL of the moving image file and the IP address to distribution portion 67.

Moving image generating portion 65 extracts, from moving image table 93 stored in HDD 116, the moving image record that includes the URL of the moving image file input from moving image reproduction request accepting portion 63, and obtains the file name of the still image that is associated with the file name of the moving image specified by the URL of the moving image file by the extracted moving image record. Moving image generating portion 65 then selects and reads the still image data specified by the obtained still image file name from among still image data 95 stored in HDD 116. Then, moving image generating portion 65 generates a moving image in which the still image included in the selected still image data 95 is displayed for a predetermined period of time. In the case where the selected still image data includes a plurality of still images, moving image generating portion 65 generates a moving image in which the plurality of still images are displayed successively. Moving image generating portion 65 stores the generated moving image in the position in HDD 116 specified by the URL of the moving image file input from moving image reproduction request accepting portion 63. The moving image generated by moving image generating portion 65 has a resolution lower than that of the still image. This reduces the amount of data being transmitted and, hence, the communication load, and also deteriorates the quality of the moving image compared to that of the still image. Therefore, in the case where the frame of the moving image is printed in a hard copy form, for example, the quality of the printed image is deteriorated from that of the still image, allowing distinction from the still image.

Distribution portion 67 reads from HDD 116 the moving image stored in the position specified by the URL of the moving image file input from moving image reproduction request accepting portion 63, and transmits the read moving image to PC 200 based on the IP address. In PC 200 where the moving image reproduction program is being executed, when network I/F 204 receives the moving image transmitted from MFP 100, the received moving image is displayed on display portion 206. This allows the user of PC 200 to view the still image stored in MFP 100 in the form of moving image. Further, the moving image transmitted instead of the still image prevents a duplicate of the still image from being stored in HDD 205 in PC 200. As the moving image is distributed in real time, the moving image is not stored in HDD 205 in PC 200. This prevents a duplicate of the still image from being generated based on the moving image. Furthermore, with the resolution of the moving image lower than that of the still image, even if the moving image is stored in HDD 205, the image quality becomes poorer than that of the still image. Thus, even if the frame of the moving image is printed in a hard copy form, the printed image is lower in quality than the still image. Accordingly, it is possible to prevent a duplicate of the still image itself from being stored in HDD 116.

Further, distribution portion 67 erases the moving image stored in HDD 116 once distribution of the moving image is finished. Thus, even if the metafile is directly designated from PC 200, the moving image would not be distributed, because the file of the moving image specified by the URL included in the metafile does not exist in HDD 116. While the present embodiment is configured to store the moving image generated by moving image generating portion 65 in HDD 116, the moving image generated by moving image generating portion 65 may be output directly to distribution portion 67, without being stored in HDD 116. In this case, the moving image is not stored in HDD 116, and therefore, it is unnecessary to erase the moving image after distribution thereof.

The Web page displayed in PC 200 includes a command to accept a print instruction and a command to return the print instruction. Referring again to FIG. 7, area 303 in Web page screen 300 for receiving input of the print instruction includes options of "current page", "all", and "selected pages", with check boxes arranged to the left of the respective options. When the check box to the left of the option "current page" and button 307 having "PRINT" thereon are designated by operation portion 207, a print command including the information for specifying the page assigned to the moving image frame being displayed in area 301 is transmitted via network I/F 204 to MFP 100. The information for specifying the page assigned to the moving image frame being displayed in area 301 is an elapsed time from the start of the moving image until the relevant frame is reproduced. The still image data based on which the moving image was generated includes a plurality of still images arranged in a predetermined order, and the moving image is generated so as to display the plurality of still images at predetermined intervals. It is thus possible to specify the still image from the elapsed time.

When the check box to the left of the option "all" and button 307 having "PRINT" thereon are designated by operation portion 207, a print command including the information for specifying all the pages is transmitted via network I/F 204 to MFP 100.

When the check box to the left of the option "selected pages" and button 307 having "PRINT" thereon are designated by operation portion 207, a print command including the information for specifying one or more pages corresponding to the page number(s) input to an area 305 arranged to the right of the option is transmitted via network I/F 204 to MFP 100. The still image data based on which the moving image was generated includes a plurality of still images arranged in a predetermined order as described above, and thus, when the page numbers are applied to the still images according to the arranged order, the still image can be specified from the page number.

The print command transmitted from PC 200 is received at communication I/F portion 112 in MFP 100. Returning to FIG. 5, when communication I/F portion 112 receives the print command, print instruction accepting portion 69 accepts the print command and the IP address of PC 200 that issued the command from communication I/F portion 112. Then, on the condition that a session is established with PC 200, print instruction accepting portion 69 outputs the received print command to image formation control portion 71.

Image formation control portion 71 reads one or more still images specified by the input print command from still image data 95 stored in HDD 116, and causes image forming portion 140 to form each still image on a respective sheet of paper.

Specifically, image formation control portion 71 extracts from moving image table 93 the moving image record that includes the file name of the moving image being distributed by distribution portion 67, and obtains the file name of still image data 95 that is associated with the moving image file name by the extracted moving image record. It then reads still image data 95 having the obtained file name from HDD 116.

In the case where the print command includes an elapsed time as the information for specifying a page, image formation control portion 71 specifies the page of the still image based on the elapsed time, and causes image forming portion 140 to form the still image of the specified page of the read still image data 95. In the case where the print command includes the information for specifying all the pages, image formation control portion 71 causes image forming portion 140 to form all the still images included in the read still image data 95. Further, in the case where the print command includes the information for specifying one or more page numbers, image formation control portion 71 causes image forming portion 140 to form the still images of the pages corresponding to the page numbers specified by the print command among the plurality of still images included in the read still image data 95.

At the time point when a print command is accepted by print instruction accepting portion 69, image formation control portion 71 causes image forming portion 140 to form the still image(s) according to the print command, on the condition that a session is being established with PC 200. This prevents a still image from being formed on a sheet of paper according to an instruction from an unauthorized person.

While description has been made about the case where content generating portion 53 generates a content including a Web page and a metafile, a Web page including a command to distribute a moving image in real time may be generated. In this case, the command to distribute the moving image in real time is described, e.g., in JAVA (registered trademark) script.

Figure 8:
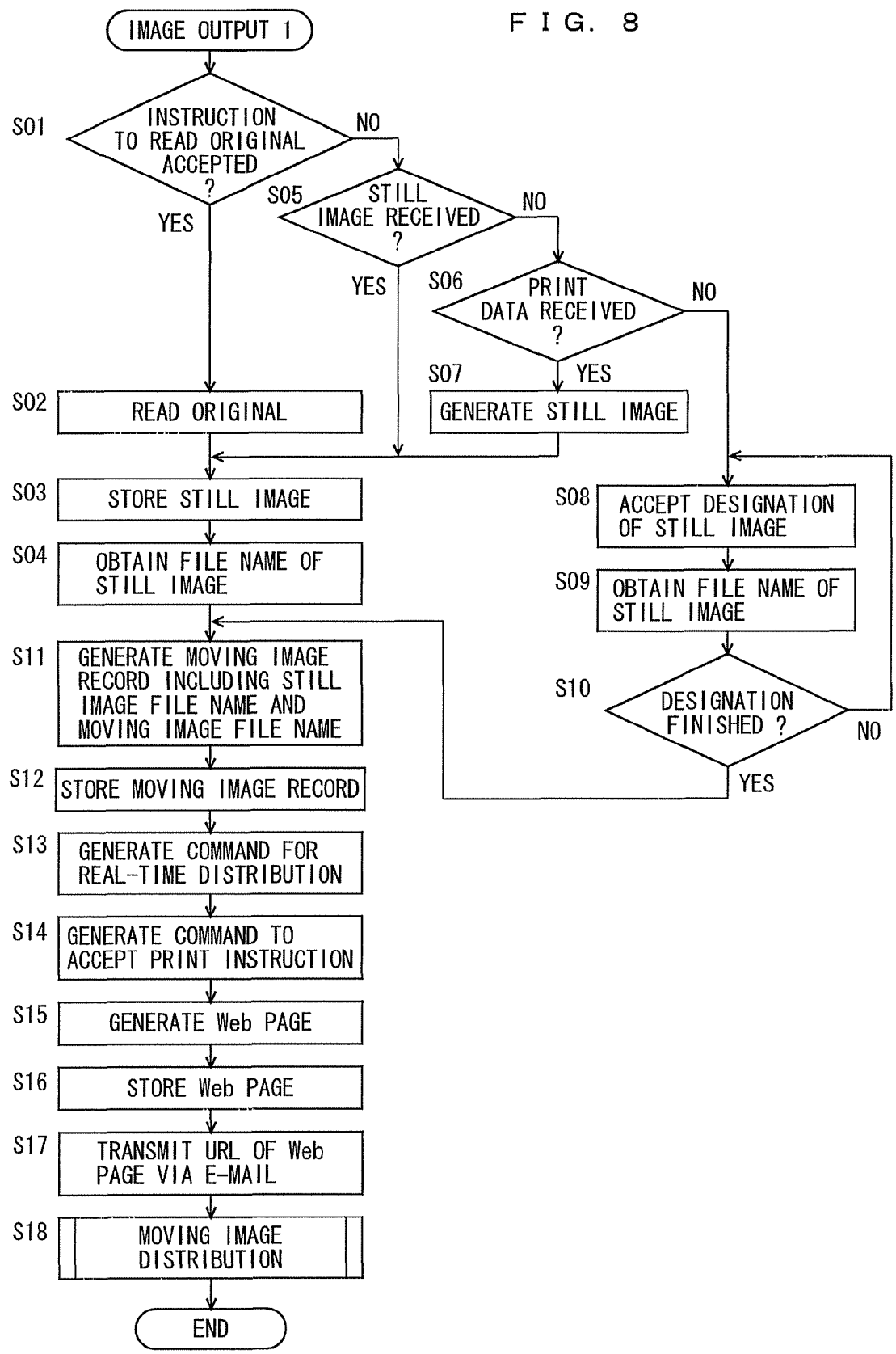
FIG. 8 is a flowchart illustrating an example of the flow of image output processing.

FIG. 8 is a flowchart illustrating an example of the flow of image output processing, which is carried out by CPU 111 included in MFP 100 as CPU 111 executes an image output program. The image output program is part of an image distribution program. Referring to FIG. 8, CPU 111 determines whether an instruction to read an original has been accepted (step S01). When the user inputs an instruction to read an image of the original to operation portion 160B, image obtaining portion 51 receives the original reading instruction from operation portion 160B. The original reading instruction is accepted, e.g., when a scan button provided in operation portion 160B is depressed, followed by depression of a start button. If the instruction to read the original is input, the process proceeds to step S02; otherwise, the process proceeds to step S05.

In step S02, CPU 111 causes original reading portion 130 to read an image of the original, and obtains from original reading portion 130 the still image that original reading portion 130 outputs by reading the image of the original. In step S05, CPU 111 determines whether communication I/F portion 112 has received a still image from a PC connected to network 2. If the still image is received, the process proceeds to step S03; otherwise, the process proceeds to step S06. In step S06, it is determined whether communication I/F portion 112 has received print data from a PC. If the print data is received, the process proceeds to step S07; otherwise, the process proceeds to step S08. In step S07, a still image is generated form the print data, and the process proceeds to step S03.

In step S03, the still image obtained in step S02, the still image received in step S05, or the still image generated in step S07 is stored as still image data 95 in HDD 116, and a file name of still image data 95 stored in HDD 116 is obtained (step S04). The process then proceeds to step S11. In the case where original reading portion 130 reads a plurality of originals in step S02, in the case where communication I/F portion 112 receives a plurality of still images in step S05, or in the case where a plurality of pages of print data are received in step S06, the plurality of still images are stored as a block as still image data 95 in HDD 116, and the file name of that still image data 95 is obtained.

In step S08, the file names of the still image data stored in HDD 116 are displayed, and when the user inputs to operation portion 160B designation of any of the displayed file names, the designation is accepted. The file name of the designated still image data is obtained (step S09), and it is determined whether designation has been finished (step S10). If the designation is finished, the process proceeds to step S11; otherwise, the process returns to step S08. Completion of the designation is accepted as the user inputs an operation to designate completion of the designation to operation portion 160B. As a result, at least one file name for the still image data is obtained.

In step S11, a moving image record including the file name of still image data 95 obtained in step S04 or S09 and a file name of a moving image is generated. The generated moving image record is additionally stored in moving image table 93 that is stored in HDD 116 (step S12).

In the following step S13, a command for real-time distribution of a moving image is generated. Specifically, a metafile is generated and stored in HDD 116, and a command including the URL of the metafile is generated. The metafile, described in a markup language, includes a command to distribute the moving image in real time. The command described in the metafile includes a URL of the moving image file, as will be described later, and is a command to communicate in accordance with a communication protocol for real-time distribution such as RTSP (Real Time Streaming Protocol) or MMS (Microsoft Media Server).

In step S14, a command to accept a print instruction is generated. Specifically, a command to display an area for receiving input of the information specifying a page to be printed and a command to return the information input to that area to MFP 100 are generated.

Then, a Web page is generated (step S15) and stored in HDD 116 (step S16). The Web page includes the command to perform real-time distribution, generated in step S13, and the print instruction accepting command, generated in step S14. In the following step S17, e-mail including a URL of the stored Web page and having a predetermined e-mail address as its destination is generated and transmitted.

As such, when the user causes PC 200 to receive the e-mail, the URL of the Web page is displayed on display portion 206. Further, when the user designates the URL of the Web page, PC 200 executes the browser program, so that the Web page is displayed on display portion 206. Here, the Web page shown in FIG. 7 is displayed on display portion 206 in PC 200. When the user designates a reproduction button included in area 301 on the Web page via operation portion 207, a signal including the URL of the metafile and requesting transmission of the metafile is transmitted via network I/F 204 to MFP 100.

Further, when the user inputs information specifying a page to be printed in area 303 for receiving an input of the print instruction on the Web page and designates button 307 having "PRINT" thereon, the print command including the information specifying the page to be printed is transmitted via network I/F 204 to MFP 100. In MFP 100 which receives the print command from PC 200, moving image distribution processing is carried out (step S18).

Figure 9:
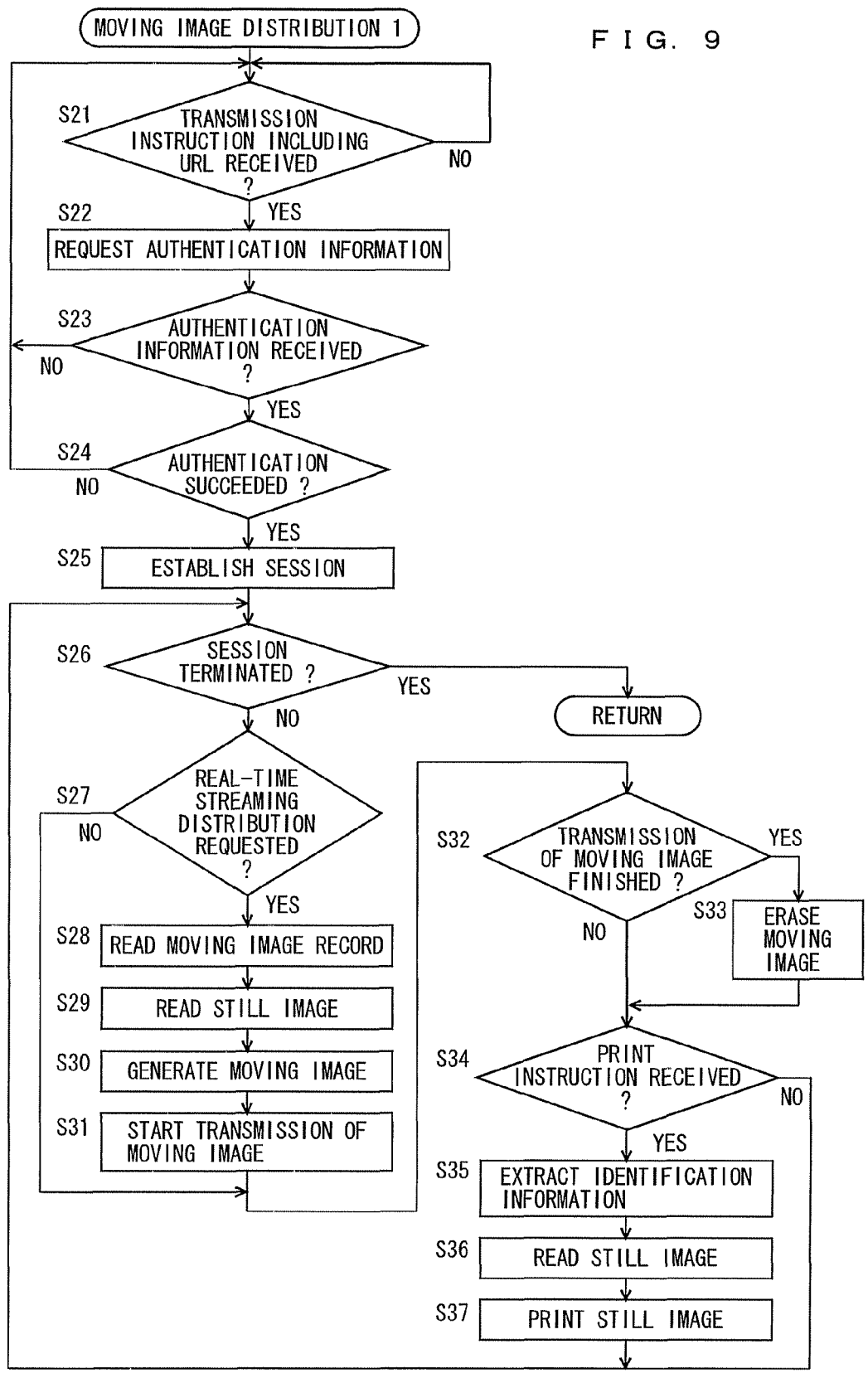
FIG. 9 is a flowchart illustrating an example of the flow of moving image distribution processing.

FIG. 9 is a flowchart illustrating an example of the flow of the moving image distribution processing. The moving image distribution processing is carried out in step S18 in FIG. 8. Referring to FIG. 9, CPU 111 determines whether a Web page transmission instruction including the URL of the Web page has been received (step S21). CPU 111 is in a standby mode until the Web page transmission instruction is received (NO in step S21), and once the Web page transmission instruction is received (YES in step S21), the process proceeds to step S22. Here, it is assumed that the Web page transmission instruction is received from PC 200.

In step S22, authentication information is requested. Specifically, based on the IP address assigned to PC 200 which issued the transmission instruction received in step S21, an authentication Web page for requesting log-in is transmitted to PC 200. The authentication Web page has an area for receiving input of a password as authentication information, and includes a command to transmit the password input in that area to MFP 100. When the user of PC 200 inputs a password to operation portion 207 of PC 200, PC 200 transmits the password via network I/F 204 to MFP 100.

In step S23, it is determined whether the password as the authentication information has been received. If so, the process proceeds to step S24; otherwise, the process returns to step S21. That the password is not received is regarded as the same as the failure in authentication.

In step S24, it is determined whether authentication based on the authentication information has been succeeded. If so, the process proceeds to step S25; otherwise, the process returns to step S21. If the password received from PC 200 in step S23 matches a predetermined password, it is determined that the authentication is successful; otherwise, it is determined that the authentication is unsuccessful. The predetermined password may be stored in HDD 116 in association with the user, or it may be stored in HDD 116 in association with the Web page. When the password is stored in association with the user, the user who can log in to MFP 100 is able to download the Web page. When the password is stored in association with the Web page, the user who has input the still image to MFP 100, or the user who has received the e-mail, is able to download the Web page.

In step S25, a session is established with PC 200 that transmitted the transmission instruction received in step S21. It is then determined whether the session is terminated (step S26), and the process returns to the image output processing upon termination of the session. Steps S27 to S37 are repeated until the session is terminated.

In step S27, it is determined whether real-time streaming distribution has been requested. If so, the process proceeds to step S28; otherwise, the process proceeds to step S32. Determination as to whether the real-time streaming distribution is requested is made on the condition that the session is being established. Presence/absence of the real-time streaming distribution request is determined according to whether the signal requesting transmission of the metafile and the moving image reproduction requesting signal have been received. Firstly, if the signal requesting transmission of the metafile is received, the metafile specified by the URL included in the signal requesting transmission of the metafile is read from HDD 116, and the metafile is transmitted to PC 200. PC 200, which received the metafile, transmits the moving image reproduction requesting signal via network I/F 204 to MFP 100, and thus, the moving image reproduction requesting signal transmitted from PC 200 is received.

In step S28, the URL of the moving image file included in the command included in the moving image reproduction requesting signal received in step S27 is obtained, and the moving image record including the file name of that moving image file is read from moving image table 93 stored in HDD 116.

Next, still image data 95 specified by the still image file name included in the read moving image record is read from HDD 116 (step S29). Then, a moving image is generated based on the read still image data 95 (step S30). Specifically, the moving image displaying the still image included in still image data 95 for a predetermined period of time is generated. In the case where still image data 95 includes a plurality of still images, the moving image of a so-called slide-show type is generated which displays the still images successively each for a predetermined period of time.

Then, transmission of the generated moving image to PC 200 that issued the moving image reproduction request is started (step S31). In step S32, it is determined whether the transmission of the moving image has been finished. If the moving image has been transmitted completely, the process proceeds to step S33; otherwise, the process proceeds to step S34. In step S33, the moving image generated in step S30 is erased from HDD 116, and the process proceeds to step S34. Thus, even if the metafile is directly designated in PC 200, the moving image is not distributed, because the file of the moving image specified by the URL included in the metafile does not exist in HDD 116.

In step S34, it is determined whether a print instruction has been received. If so, the process proceeds to step S35; otherwise, the process returns to step S26. Determination as to whether the print instruction has been received is made on the condition that the session is being established. This prevents a still image from being formed on a sheet of paper according to an instruction from an unauthorized person.

The Web page displayed on PC 200, as shown in FIG. 7, includes area 303 for receiving input of the print instruction. When any of the check boxes arranged to the left of the options "current page", "all", and "selected pages" is designated and button 307 having "PRINT" thereon is designated, the print command including the information for specifying the page(s) is transmitted to MFP 100.

In step S35, the information included in the print instruction received in step S34 is extracted as the identification information. Then, the still image is read from still image data 95 stored in HDD 116 (step S36). Specifically, the moving image record including the file name of the moving image of which transmission was started in step S31 is extracted from moving image table 93, and the still image file name associated with the moving image file name by the extracted moving image record is obtained. Then, still image data 95 having the obtained still image file name is read from HDD 116.

In step S37, the read still image data 95 is output to image forming portion 140, to cause it to print the still image. In the case where the information obtained in step S35 includes the elapsed time, the page of the still image is specified from the elapsed time, and the still image of that page among the plurality of still images included in still image data 95 is printed. In the case where the information obtained in step S35 specifies all the pages, all the still images included in the read still image data 95 are printed. In the case where the information obtained in step S35 specifies one or more page numbers, all the still images corresponding to the specified page numbers among the plurality of still images included in the read still image data 95 are printed.

As described above, in response to reception of the print instruction from PC 200, the still image based on which the moving image currently transmitted was generated is printed. It is unnecessary to transmit the still images to PC 200, because PC 200 is able to determine the still image(s) to be printed and instruct printing thereof. Further, of still image data 95, only the still image(s) corresponding to the page(s) specified by the information included in the print instruction is/are printed. That is, the still image(s) to be printed can be selected from among the plurality of still images.

Figure 10:
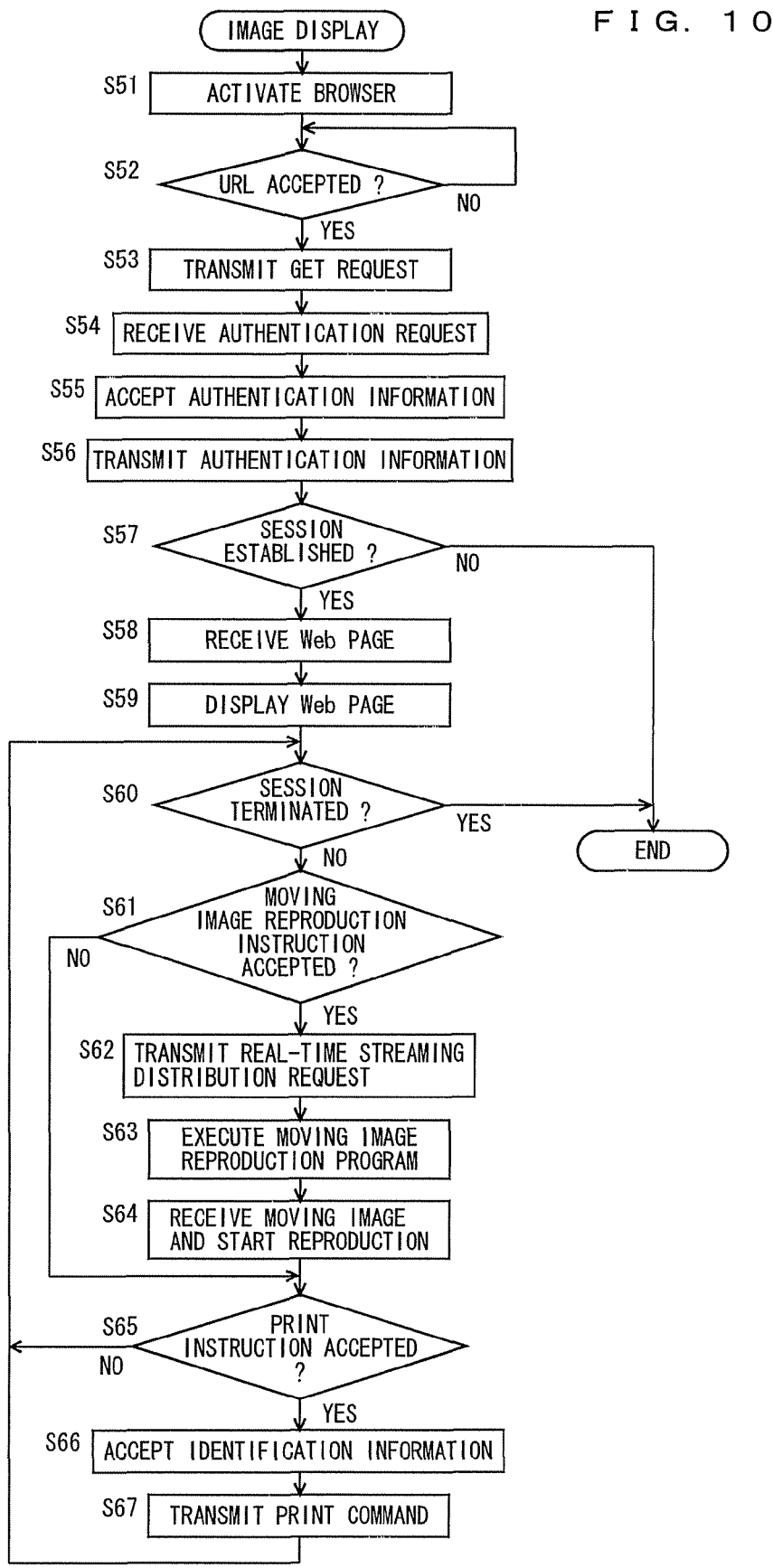
FIG. 10 is a flowchart illustrating an example of the flow of image display processing.

FIG. 10 is a flowchart illustrating an example of the flow of image display processing, which is carried out by CPU 201 included in PC 200 as CPU 201 executes a browser program or a moving image reproduction program.

Referring to FIG. 10, CPU 201 executes the browser program (step S51). It then determines whether a URL has been accepted (step S52). CPU 201 is in a standby mode until the URL is accepted, and once the URL is accepted, the process proceeds to step S53. It is noted that the user may cause PC 200 to receive e-mail transmitted from MFP 100 and designate a URL included in the e-mail displayed on display portion 206, to thereby cause PC 200 to accept the instruction to activate the browser program and the operation to designate the URL.

In step S53, a GET request is transmitted which includes the URL accepted in step S52. Here, the URL includes the IP address assigned to MFP 100 that issued the e-mail, and thus, the GET request is transmitted to MFP 100.

Then, an authentication request is received (step S54). Here, the authentication Web page transmitted from MFP 100 is received and displayed on display portion 206, and the authentication information input by the user to operation portion 207 is accepted (step S55). The accepted authentication information is transmitted to MFP 100 (step S56).

In step S57, it is determined whether the session has been established. If authentication succeeds in MFP 100 based on the authentication information transmitted in step S56, a Web page is transmitted from MFP 100. Thus, it is determined that the session has been established when the Web page is received from MFP 100; otherwise, it is determined that the session is not established, and the process is terminated.

In step S58, the Web page transmitted from MFP 100 is received. The received Web page is displayed on display portion 206 (step S59). Here, the Web page screen shown in FIG. 7 is displayed. In step S60, it is determined whether the session is terminated. If so, the process is terminated; otherwise, the process proceeds to step S61. For example in the case where an instruction to terminate the browser program started in step S51 is received from the user, it is determined that the session is terminated. Further, when a signal for terminating the session is received from MFP 100, it is determined that the session is terminated.

In step S61, it is determined whether a moving image reproduction instruction has been accepted. When the reproduction button included in area 301 on the Web page that is displayed on display portion 206 in step S59 is designated by operation portion 207, the moving image reproduction instruction is accepted. If the moving image reproduction instruction is accepted, the process proceeds to step S62; otherwise, the process proceeds to step S65. In step S62, a real-time streaming distribution request is transmitted to MFP 100. Firstly, a signal requesting transmission of the metafile linked to area 301 of the Web page is transmitted via network I/F 204 to MFP 100. In response, the metafile is received from MFP 100. Thus, the moving image reproduction requesting signal included in the metafile is transmitted via network I/F 204 to MFP 100.

The moving image reproduction program is then carried out (step S63). The moving image transmitted from MFP 100 is received, and reproduction thereof is started (step S64).

In step S65, it is determined whether a print instruction has been accepted. The Web page displayed on display portion 206 includes area 303 for receiving input of the print instruction and button 307 having "PRINT" thereon. When "PRINT" button 307 has been designated, the print instruction is accepted. If the print instruction is accepted, the process proceeds to step S66; otherwise, the process returns to step S60.

In step S66, identification information is accepted. The identification information is the information for specifying the page(s). In the case where the check box corresponding to "current page" included in area 303 on the Web page is designated, the elapsed time is accepted as the identification information. In the case where the check box corresponding to "all" is designated, all the pages are accepted as the identification information. In the case where the check box corresponding to "selected pages" is designated, one or more page numbers input in area 305 are accepted as the identification information.

A print command including the accepted identification information is transmitted to MFP 100 (step S67), and the process returns to step S60.

As described above, according to image distribution system 1 of the present embodiment, each of MFPs 100, 101, and 102 obtains still images and generates a moving image in which the obtained still images are displayed successively. In response to a request from PC 200, real-time streaming distribution of the moving image is executed. Because the moving image is transmitted instead of the still images, it is possible to prevent the still images from being transmitted to PC 200. Further, because the moving image is not stored in PC 200, generation of a duplicate of the moving image is prevented.

Furthermore, in response to reception of a print instruction during the real-time streaming distribution of the moving image, one or more still images corresponding to the page(s) specified by the identification information included in the print instruction, among the still images based on which the moving image was generated, are formed on sheets of paper. This allows the still images to be formed in MFPs 100, 101, and 102.

Still further, a Web page containing a command to request real-time streaming distribution of the moving image and a command to cause a computer to accept the print instruction is generated and stored in HDD 116, and e-mail including the URL assigned to the Web page is transmitted. This allows the user who received the e-mail to download the Web page to PC 200, to thereby cause PC 200 to execute the command to request real-time streaming distribution of the moving image and the command to cause the computer to accept the print instruction.

<Modification>

MFP 100 in the above-described embodiment is configured to convert a still image to a moving image and distribute the moving image in real time. In contrast, MFP 100 according to a modification is configured to obtain a first moving image separately from a still image, and distribute a third moving image which is a combination of the first moving image with a second moving image that is converted from the still image. Hereinafter, MFP 100 according to the modification will be described, focusing primarily on the differences from MFP 100 described above.

Figure 11:
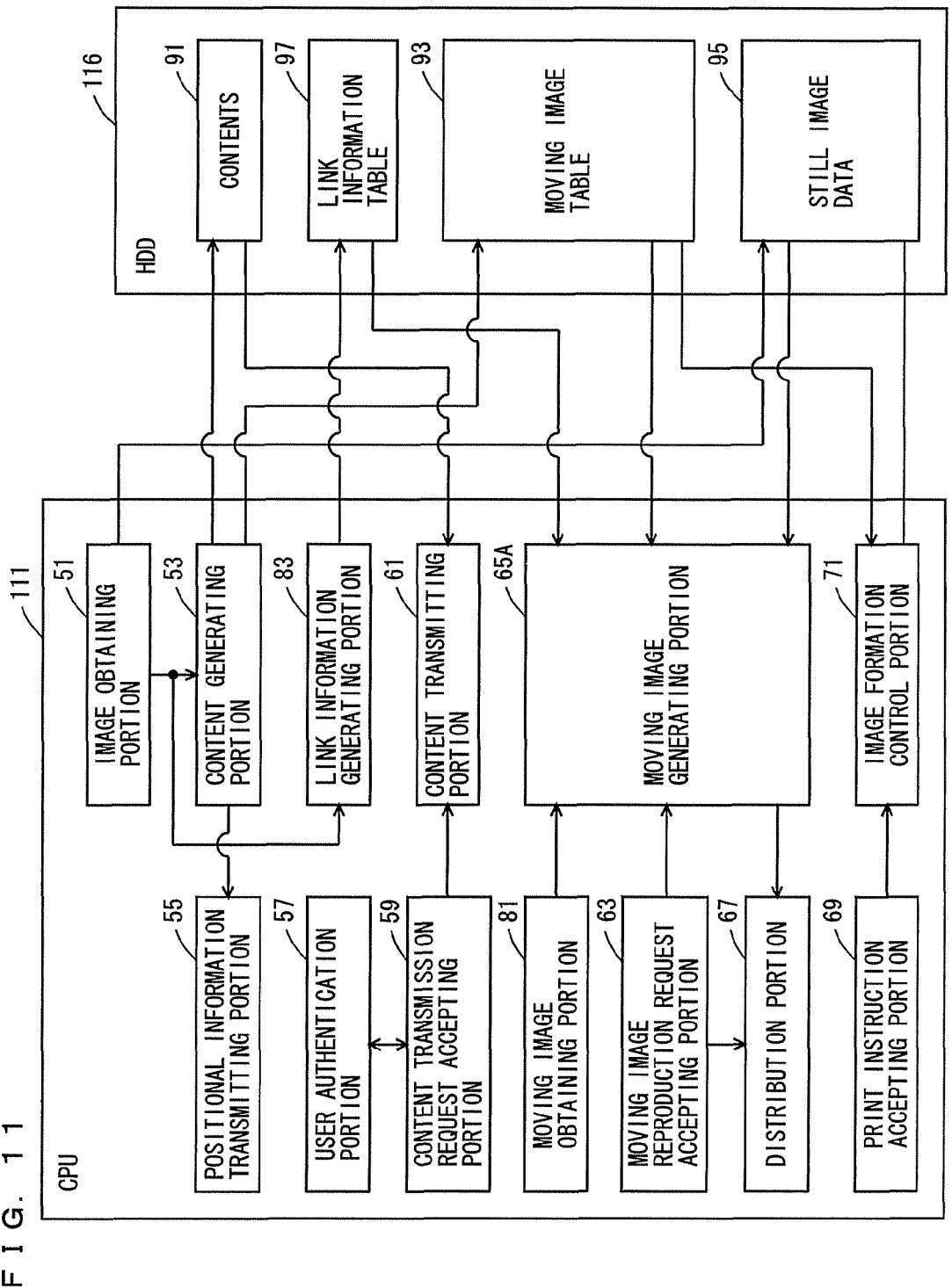
FIG. 11 is a functional block diagram showing an example of the functions of the CPU included in the MFP according to a modification, together with data stored in the HDD.

FIG. 11 is a functional block diagram showing an example of the functions of the CPU included in the MFP of the modification, together with the data stored in the HDD. FIG. 11 differs from the functional block diagram shown in FIG. 5 in that a moving image obtaining portion 81 and a link information generating portion 83 have been added, and moving image generating portion 65A has been modified. The remaining functions are identical to those of the above embodiment, and thus, description thereof will not be repeated here.

Link information generating portion 83 receives from image obtaining portion 51 the still image data obtained thereby. Link information generating portion 83 accepts designation of the moving image data to be inserted to the still image data, and designation of a position where the moving image data is to be inserted among the plurality of still images included in the still image data. Specifically, a preview screen sequentially displaying the plurality of still images included in the still image data is displayed on display portion 160A to accept designation of the inserting position, while a moving image designation screen is displayed on display portion 160A to accept designation of the moving image data.

Link information generating portion 83 generates a link information record in which the accepted inserting position and the accepted moving image data are associated with each other, and additionally stores the generated link information record in link information table 97 stored in HDD 116. The link information record has the identification information for identification of the still image data, the inserting position in the still image data, and the positional information of the moving image data on the network, which are associated with each other.

Figure 12:
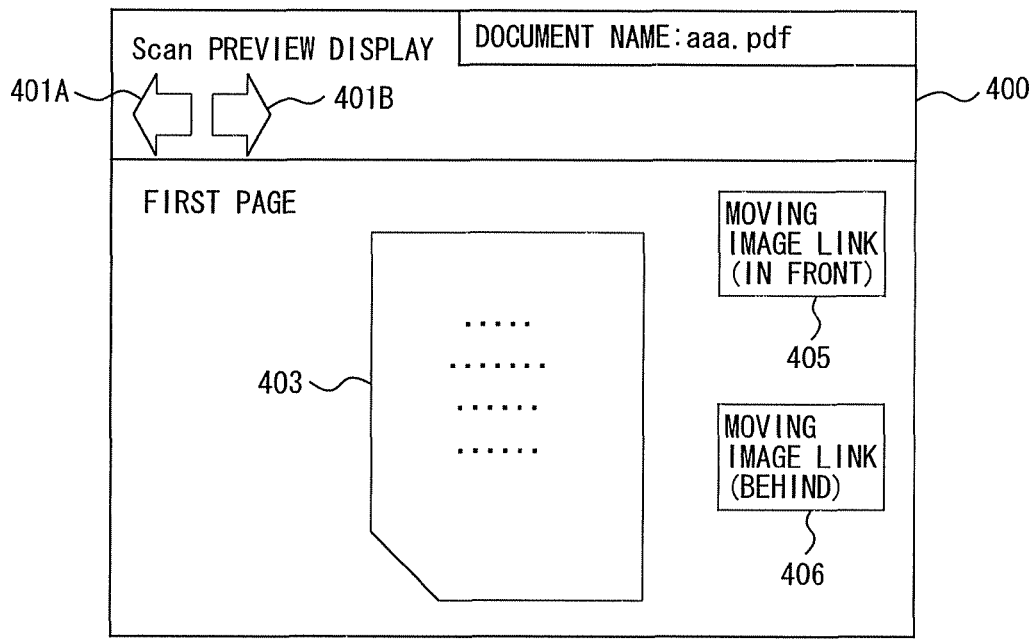
FIG. 12 shows an example of a preview screen.

FIG. 12 shows an example of the preview screen. Referring to FIG. 12, the preview screen 400 includes: a still image display area 403 for displaying one of a plurality of still images included in the still image data; a page forward button 401B and a page back button 401A for designating switching of the still image displayed in still image display area 403; and a moving image link (in front) button 405 and a moving image link (behind) button 406 for designating the position for inserting the moving image data. Preview screen 400 is displayed after the still image data is obtained, and a still image of the first page among a plurality of still images included in the still image data is firstly displayed in still image display area 403. When page forward button 401B is designated, a still image of the page immediately following that of the still image being displayed in still image display area 403 at that time is displayed in still image display area 403. When page back button 401A is designated, a still image of the page immediately preceding that of the still image being displayed in still image display area 403 at that time is displayed in still image display area 403.

Moving image link (in front) button 405 and moving image link (behind) button 406 are for designating the position in the still image data where the moving image data is to be inserted. When moving image link (in front) button 405 is designated, the position in front of the still image being displayed in still image display area 403 at that time, i.e., the position between the still image being displayed in still image display area 403 at that time and the still image of the page immediately preceding that of the still image being displayed is designated as the inserting position. When moving image link (behind) button 406 is designated, the position behind the still image being displayed in still image display area 403 at that time, i.e., the position between the still image being displayed in still image display area 403 at that time and the still image of the page immediately following that of the still image being displayed is designated as the inserting position. When one of moving image link (in front) button 405 and moving image link (behind) button 406 is designated, the moving image designation screen is displayed.

Figure 13:
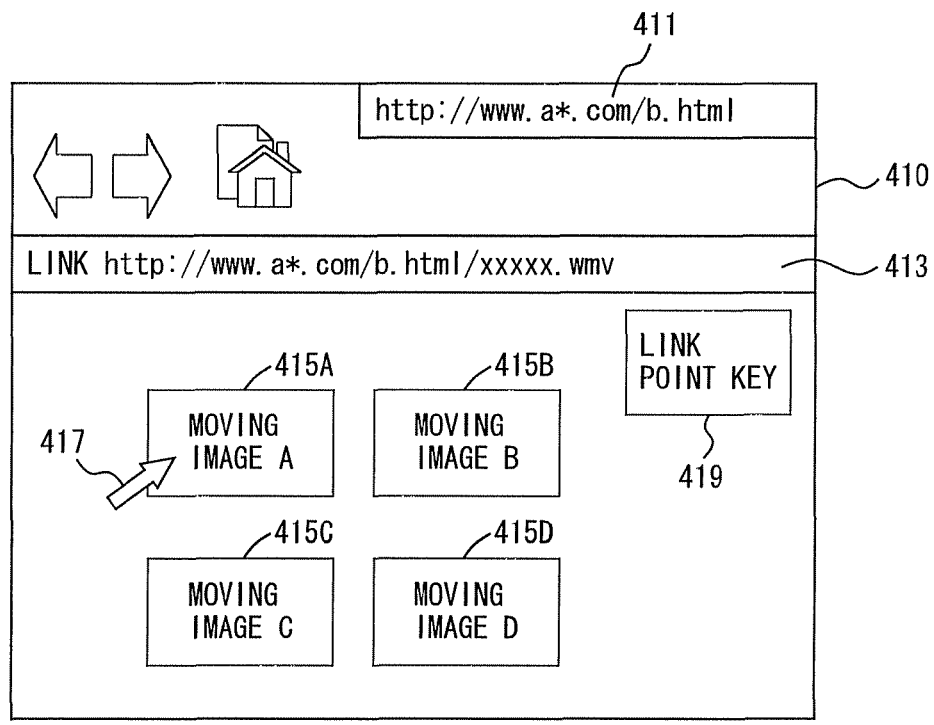
FIG. 13 shows an example of a moving image designation screen.

FIG. 13 shows an example of the moving image designation screen. Referring to FIG. 13, the moving image designation screen 410 includes: areas 411 and 413 each for displaying a URL; areas 415A to 415D each for displaying a moving image; and a link point key 419. In area 411, a predetermined URL set as a default is displayed, which indicates the position where the moving images displayed in respective areas 415A to 415D are stored. Inputting a different URL in area 411 can change the moving images displayed.

When the user uses a pointing device such as a touch panel at operation portion 160B to designate one of areas 415A to 415D, the moving image being displayed in the designated area is selected, and an arrow 417 is displayed to indicate that the selection has been made. Further, the URL of the selected moving image is displayed in area 413.

When link point key 419 is designated, the URL of the moving image being selected at that time is accepted, and the display is switched to the preview screen shown in FIG. 12.

FIG. 14 shows an example of the link information table. Referring to FIG. 14, the link information table includes link information records, which each include the fields of: still image file name, inserting position, and URL of moving image data. In the field of still image file name, the identification information of the still image data is set. In the field of inserting position, the page number for specifying one of the plurality of still images included in the still image data is set. Here, it is assumed that the inserting position is the position behind the still image having the page number set in the inserting position field. In the field of URL of moving image data, the URL is set which is the positional information, on the network, of the moving image data designated by the user in moving image designation screen 410. For example, the link information record shown in FIG. 14 indicates, for the still image data having the file name "Document 1.pdf" as the identification information, that the inserting positions are behind "page 1" and behind "page 5", and that the moving image data specified by the URL "http://www.yyydoga.com/xxxxx." is inserted in the inserting position behind "page 1" and the moving image data specified by the URL "http://www.yyydoga.com/xxxxy" is inserted in the inserting position behind "page 5".

Although the link information table shown here indicates that one piece of moving image data is to be inserted into one inserting position, in the case where a plurality of pieces of moving image data are to be inserted in one inserting position, there are more than one link information record having the same inserting position. In this case, it is configured such that the plurality of pieces of moving image data designated by the link information records having the same inserting position are to be inserted for example according to the order in which the records have been stored.

Returning to FIG. 11, moving image generating portion 65A extracts, from moving image table 93 stored in HDD 116, the moving image record including the URL of the moving image file input from moving image reproduction request accepting portion 63, and obtains a still image file name associated with the URL of the moving image file by the extracted moving image record. Further, it extracts, from link information table 97 stored in HDD 116, the link information record including the obtained still image file name. When the link information record including the obtained still image file name is extracted from link information table 97, it obtains the inserting position and the URL of moving image data that are set in the corresponding fields in the extracted link information record. Moving image generating portion 65A then outputs the URL of moving image data that is set in the corresponding field in the link information record to moving image obtaining portion 81.

In response, moving image obtaining portion 81 obtains the moving image data specified by the URL of moving image data input from moving image generating portion 65A, and outputs the obtained moving image data to moving image generating portion 65A. The URL of moving image data input from moving image generating portion 65A is the information for identification of the moving image specified by the user in moving image designation screen 410. Here, the moving image data obtained by moving image obtaining portion 81 is referred to as a "first moving image". The first moving image may be the moving image data stored in HDD 116 or the moving image data stored in a computer connected to network 2. In the case of the moving image data stored in the computer connected to network 2, moving image obtaining portion 81 obtains the moving image data by downloading the data from the other computer via communication I/F portion 112.

Moving image generating portion 65A selects and reads, from still image data 95 stored in HDD 116, the still image data specified by the obtained still image file name. Moving image generating portion 65A then generates a "second moving image" in which a plurality of still images included in the selected still image data 95 are successively displayed each for a predetermined period of time. During generation of the moving image which displays a plurality of still images successively, when there comes a position corresponding to the obtained inserting position, the first moving image input from moving image obtaining portion 81 is inserted. In this manner, a "third moving image" is generated in which the first moving image is inserted to the user-designated inserting position in the second moving image displaying a plurality of still images.

Moving image generating portion 65A stores the generated third moving image in a position in HDD 116 specified by the URL of the moving image file input from moving image reproduction request accepting portion 63. The moving image generated by moving image generating portion 65A has the resolution lower than that of the still image. This reduces the transmitted data amount and, hence, the communication load, and deteriorates the quality of the moving image compared to that of the still image. Accordingly, in the case where the moving image frame is printed in a hard copy form, for example, the quality of the printed image is degraded from that of the still image, enabling distinction from the still image.

Figure 15:
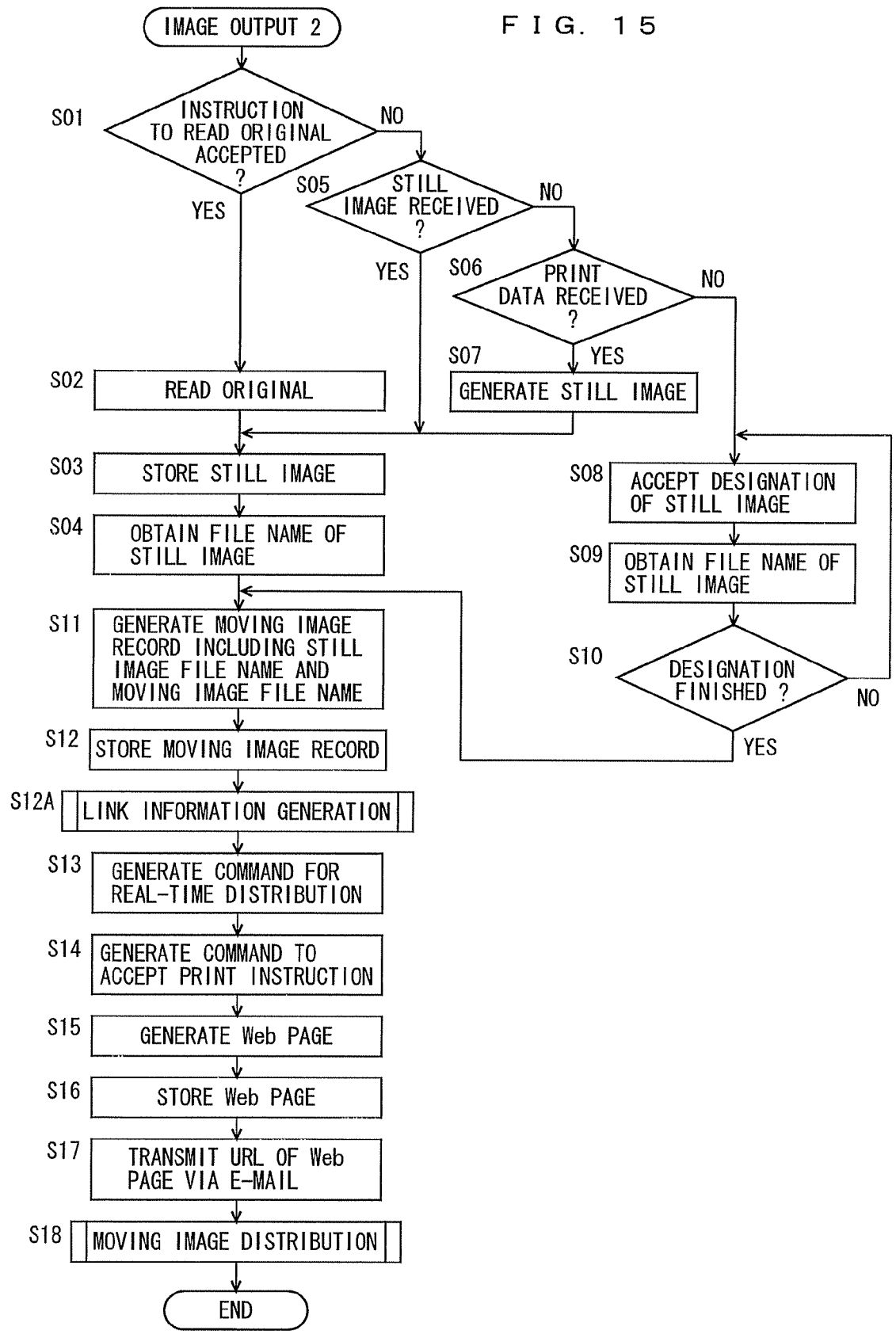
FIG. 15 is a flowchart illustrating an example of the flow of the image output processing according to the modification.

FIG. 15 is a flowchart illustrating an example of the flow of the image output processing according to the modification. The image output processing in the modification is carried out by CPU 111 included in MFP 100 as CPU 111 executes the image output program, which is part of the image distribution program. The image output processing shown in FIG. 15 differs from that shown in FIG. 8 in that step S12A is performed after step S12. The remaining processing is identical, and thus, description thereof will not be repeated here. In step S12A, link information generation processing is carried out.

Figure 16:
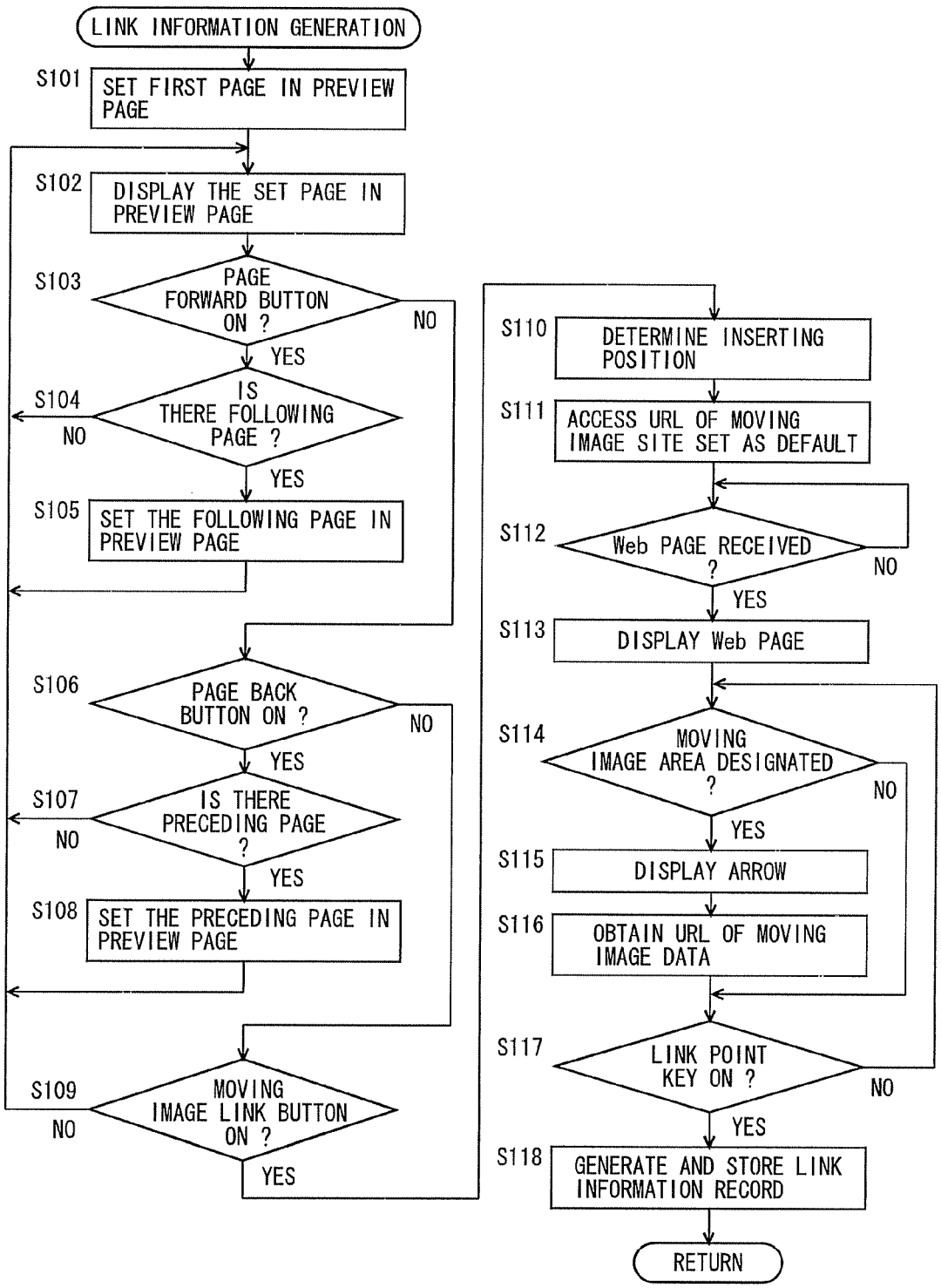
FIG. 16 is a flowchart illustrating an example of the flow of link information generation processing.

FIG. 16 is a flowchart illustrating an example of the flow of the link information generation processing, which is performed in step S12A in the image output processing according to the modification shown in FIG. 15. Here, it is assumed that a plurality of still images are stored in step S03 in FIG. 15. Referring to FIG. 16, CPU 111 sets a still image of the first page among the plurality of still images stored in step 03 in FIG. 15 in the preview page (step S101). The preview page shows the still image to be displayed on the preview screen.

CPU 111 displays the one of the plurality of still images set in the preview page on display portion 160A (step S102). Specifically, preview screen 400 with the still image set in the preview page being included in still image display area 403 is displayed on display portion 160A. It is then determined whether page forward button 401B has been designated and turned ON (step S103). If page forward button 401B is ON, the process proceeds to step S104; otherwise, the process proceeds to step S106. In step S104, it is determined whether there is a still image of the page immediately following that of the still image being set in the preview page. If there is the still image of the following page, the process proceeds to step S105; otherwise, the process returns to step S102. In step S105, the still image of the following page is set in the preview page, and the process returns to step S102.

In step S106, it is determined whether page back button 401A has been designated and turned ON. If page back button 401A is ON, the process proceeds to step S107; otherwise, the process proceeds to step S109. In step S107, it is determined whether there is a still image of the page immediately preceding that of the still image being set in the preview page. If there is the still image of the preceding page, the process proceeds to step S108; otherwise, the process returns to step S102. In step S108, the still image of the preceding page is set in the preview page, and the process returns to step S102.

In step S109, it is determined whether one of moving image link (in front) button 405 and moving image link (behind) button 406 has been designated and turned ON. If either moving image link (in front) button 405 or moving image link (behind) button 406 is ON, the process proceeds to step S110; otherwise, the process returns to step S102.

In step S110, the inserting position is determined. In the case where moving image link (in front) button 405 is ON in step S109, the position in front of the still image being set in the preview page, i.e., the position between the still image being set in the preview page and the still image of the immediately preceding page is determined as the inserting position. In the case where moving image link (behind) button 406 is ON in step S109, the position behind the still image being set in the preview page, i.e., the position between the still image being set in the preview page and the still image of the immediately following page is determined as the inserting position.

In the following step S111, the URL of the moving image site set as a default is accessed. The browsing program is started, and a GET command including the URL is transmitted. CPU 111 is in a standby mode until a Web page is received (NO in step S112), and once the Web page is received (YES in step S112), the process proceeds to step S113. In step S113, the Web page received in step S112 is displayed. Specifically, moving image designation screen 410 including the Web page is displayed on display portion 160A.

It is then determined whether any of areas 415A to 415D displaying the moving images on moving image designation screen 410 has been designated (step S114). If none of areas 415A to 415D has been designated, the process proceeds to step S117; whereas if one of them has been designated, the process proceeds to step S115. In step S115, the arrow is displayed by superposing, or in the vicinity of, the designated one of areas 415A to 415D. This notifies the user that the designation has been accepted.

The URL of the moving image data corresponding to the designated one of areas 415A to 415D is obtained (step S116). Next, it is determined whether link point key 419 has been designated and turned ON (step S117). If link point key 419 is ON, the process proceeds to step S118; otherwise, the process returns to step S114.

In step S118, the link information is generated and stored, and the process returns to the image output processing shown in FIG. 15. Specifically, the link information record associating the information for identification of the still image data being processed, the inserting position determined in step S110, and the URL of the moving image data obtained in step S116 is generated and additionally stored in link information table 97 stored in HDD 116. In the case where the moving image area is designated a plurality of number of times in step S114 before it is determined in step S117 that link point key 419 is turned ON, the link information records corresponding to the number of the designated moving image areas are generated and stored.

While the link information generation processing has been described to generate at least one link information record corresponding to one inserting position, a plurality of link information records corresponding to a plurality of inserting positions may be generated by configuring such that the process returns to step S102 after completion of step S118.

Figure 17:
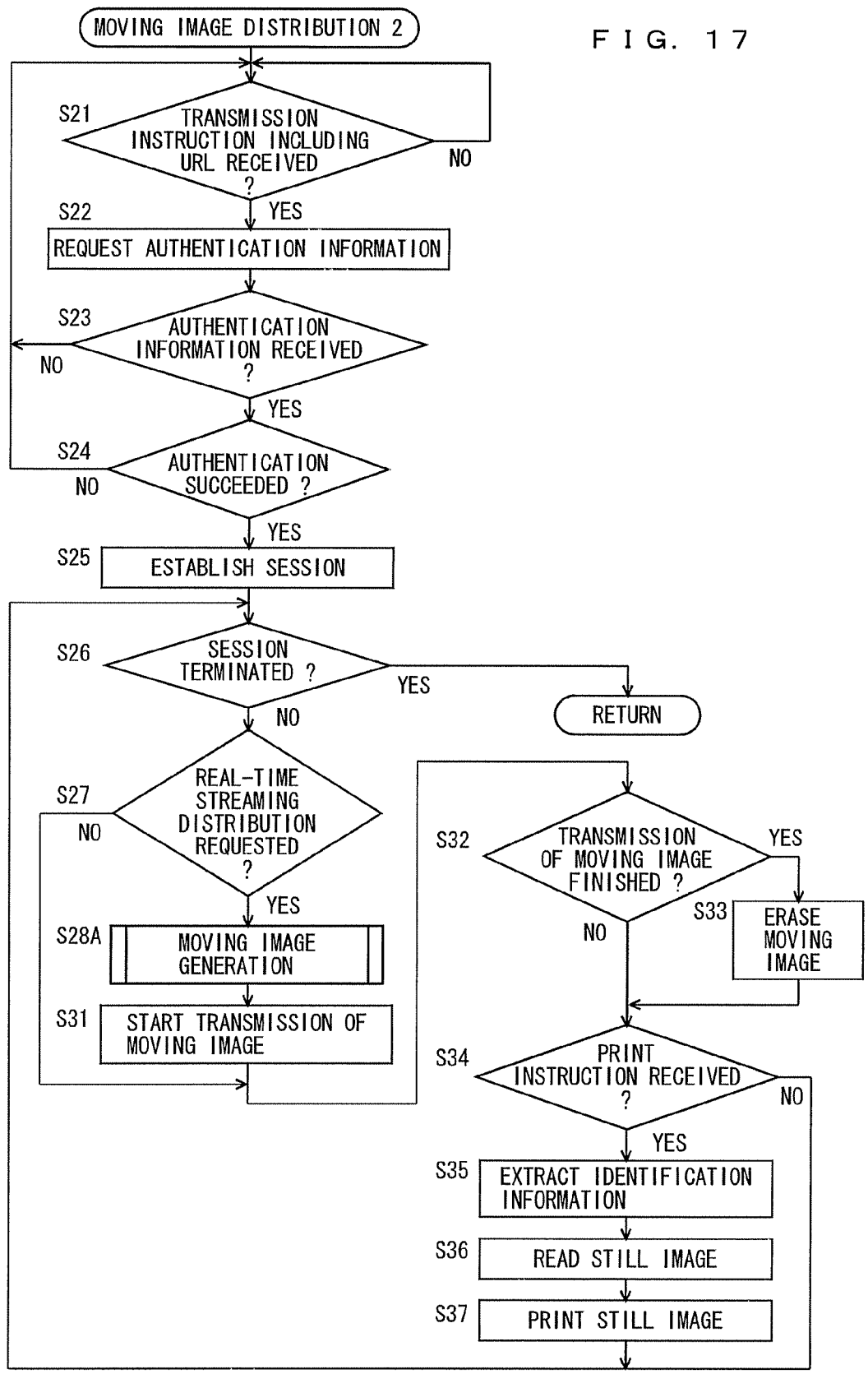
FIG. 17 is a flowchart illustrating an example of the flow of the moving image distribution processing according to the modification.

FIG. 17 is a flowchart illustrating an example of the flow of the moving image distribution processing according to the modification. The processing shown in FIG. 17 differs from the processing shown in FIG. 9 in that step S28A is performed instead of steps S28 to S30. Otherwise, the processing is identical, and thus, description thereof will not be repeated here. In step S28A, moving image generation processing is carried out.

FIG. 18 is a flowchart illustrating an example of the flow of the moving image generation processing, which is carried out in step S28A in the moving image distribution processing according to the modification shown in FIG. 17. Referring to FIG. 18, CPU 111 obtains the URL of the moving image file included in the command contained in the moving image reproduction requesting signal received in step S27 in FIG. 17, and reads, from moving image table 93 stored in HDD 116, the moving image record that includes the file name of the moving image file (step S121).

Next, CPU 111 reads, from link information table 97 stored in HDD 116, the link information record in which the still image file name included in the moving image record read in step S121 is set in the corresponding field (step S122).

CPU 111 then reads, from HDD 116, a still image of the first page in still image data 95 specified by the still image file name included in the moving image record read in step S121 (step S123). In the following step S124, it generates a moving image in which the read still image is displayed for a predetermined period of time. It is then determined whether the position behind the read still image corresponds to the inserting position that is set in the inserting position field in the link information record read in step S122 (step S125). If the position corresponds to the inserting position, the process proceeds to step S126; otherwise, the process proceeds to step S128.

In step S126, the moving image data specified by the URL set in the field of URL of moving image data in the link information record read in step S122 is downloaded. Then, the moving image reproduced from the downloaded moving image data (i.e., the first moving image) is inserted to the position behind the moving image generated in step S124 (i.e., the second moving image), to generate a new moving image (i.e., the third moving image) (step S127).

In the following step S128, it is determined whether the still image being processed corresponds to the last page of still image data 95 specified by the still image file name included in the moving image record read in step S121. If it corresponds to the last page, the process returns to the moving image distribution processing shown in FIG. 17; otherwise, the process proceeds to step S129. In step S129, a still image of the page immediately following that of the still image having been processed is read from still image data 95 stored in HDD 116, and the process returns to step S124.

As described above, according to the modification, MFP 100 carries out real-time streaming distribution of the third moving image, which is generated based on the second moving image successively displaying a plurality of still images included in the still image data, by inserting the first moving image designated by the user to the position in front of or behind the still image designated by the user. Because the moving image is transmitted instead of the still images, it is possible to prevent the still images from being transmitted to PC 200. Further, the single operation of designating one of a plurality of still images in front of or behind which the moving image is to be inserted enables transmission of the moving image in which the plurality of still images and the moving image are displayed in the predetermined order.

The position in front of or behind one of a plurality of still images included in the still image data designated by the user is accepted as the inserting position, and a link information record associating the accepted inserting position with the position of the first moving image on the network is generated and stored. In generation of the third moving image, the first moving image specified by the link information associated with the still image data is obtained, and in the second moving image sequentially displaying the plurality of still images included in the still image data, the first moving image is inserted after the still image preceding the inserting position specified by the link information is displayed. Accordingly, it is possible to insert the first moving image in an arbitrary position in the second moving image in which the plurality of still images included in the still image data are sequentially displayed.

While MFPs 100, 101, and 102 have been described as examples of the image distribution apparatus in the above embodiment, the present invention may of course be understood as an image distribution method for carrying out the image output processing illustrated in FIGS. 8 and 9 or in FIGS. 15-18, or an image distribution program for causing a computer to carry out the image distribution method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image distribution apparatus, comprising:
   an image obtaining portion to obtain one or more still images from a storage;
   a moving image generating portion to generate a moving image in which said obtained one or more still images are sequentially displayed;
   a distribution portion, which, in response to a request from a computer connected to a network, transmits said generated moving image to a device external to the image distribution apparatus, and displays said generated moving image on the external device;
   a print instruction accepting portion to accept a print instruction from the external device, wherein said print instruction includes identification information identifying selected one or more still images among said one or more still images used for generating the moving image;
   an image formation control portion to receive the print instruction from the print instruction accepting portion and obtain the selected one or more still images based on the identification information of the print instruction from the storage; and
   an image forming portion to form on one or more recording media said selected one or more still images obtained by the image formation control portion.

2. The image distribution apparatus according to claim 1, further comprising:
   a content generating portion to generate and store a content including a command to request real-time streaming distribution of said generated moving image; and a positional information transmitting portion to transmit positional information about a position on the network assigned to said stored content.

3. The image distribution apparatus according to claim 1, further comprising:
a content generating portion to generate and store a content including a command to request real-time streaming distribution of said generated moving image and a command to cause a computer to accept said print instruction; and
a positional information transmitting portion to transmit positional information about a position on the network assigned to said stored content.

4. The image distribution apparatus according to claim 1, further comprising an original reading portion to read an image of an original to output a still image, wherein
said image obtaining portion obtains said still image output from said original reading portion.

5. The image distribution apparatus according to claim 1, further comprising:
a storing portion, wherein the storage comprises the storing portion.

6. The image distribution apparatus according to claim 1, wherein said distribution portion performs the real-time streaming distribution in accordance with RTSP (Real Time Streaming Protocol) or MMS (Microsoft Media Server) protocol.

7. The image distribution apparatus according to claim 1, wherein the storage is in a device external to the image distribution apparatus.

8. The image distribution apparatus according to claim 1, wherein said moving image generating portion generates a moving image having a resolution lower than a resolution of said obtained one or more still images.

9. The image distribution apparatus according to claim 1, further comprising a moving image obtaining portion to obtain a moving image, wherein
said moving image generating portion generates a moving image by inserting said obtained moving image in front of or behind said moving image displaying one of said obtained one or more still images.

10. The image distribution apparatus according to claim 9, further comprising:
an inserting position accepting portion to accept designation of a position in front of or behind one of said obtained one or more still images; and
a link information storing portion to store link information in which said accepted inserting position and a position of said moving image displaying said obtained one or more still images on the network are associated with each other, wherein
said moving image obtaining portion obtains said moving image based on said link information, and
said moving image generating portion inserts said obtained moving image in said inserting position specified by said link information.

11. An image distribution method, comprising the steps of:
obtaining one or more still images from a storage;
generating a moving image in which said obtained one or more still images are sequentially displayed;
in response to a request from a computer connected to a network, transmitting said generated moving image to a device external to the image distribution apparatus, and displaying said generated moving image on the external device;
accepting a print instruction from the external device, wherein said print instruction includes identification information identifying selected one or more still images among said one or more still images used for generating the moving image;
obtaining the selected one or more still images from the storage based on the identification information in the print instruction; and
forming on one or more recording media said selected one or more still images obtained by the image formation control portion.

12. The image distribution method according to claim 11, further comprising the steps of:
generating and storing a content including a command to request real-time streaming distribution of said generated moving image; and
transmitting positional information about a position on the network assigned to said stored content.

13. The image distribution method according to claim 11, further comprising the steps of:
generating and storing a content including a command to request real-time streaming distribution of said generated moving image and a command to cause a computer to accept said print instruction; and
transmitting positional information about a position on the network assigned to said stored content.

14. The image distribution method according to claim 11, wherein said step of obtaining one or more still images includes the step of obtaining a still image obtained by reading an image of an original.

15. The image distribution method according to claim 11, wherein said step of performing real-time streaming distribution includes the step of performing real-time streaming distribution in accordance with RTSP (Real Time Streaming Protocol) or MMS (Microsoft Media Server) protocol.

16. The image distribution method according to claim 11, further comprising the step of receiving data, wherein
said step of obtaining one or more still images includes the step of obtaining the data received in said step of receiving data as said one or more still images.

17. The image distribution method according to claim 11, wherein said step of generating a moving image includes the step of generating a moving image having a resolution lower than a resolution of said obtained one or more still images.

18. The image distribution method according to claim 11, further comprising the step of obtaining a moving image, wherein
said step of generating a moving image includes the step of generating a moving image by inserting said obtained moving image in front of or behind said moving image displaying one of said obtained one or more still images.

19. The image distribution method according to claim 18, further comprising the steps of:
accepting designation of a position in front of or behind one of said obtained one or more still images; and
storing link information in which said accepted inserting position and a position of said moving image displaying said obtained one or more still images on the network are associated with each other, wherein
said step of obtaining a moving image includes the step of obtaining said moving image based on said link information, and
said step of generating a moving image includes the step of inserting said obtained moving image in said inserting position specified by said link information.

20. A non-transitory computer readable medium storing an image distribution program, which causes a computer to carry out the steps of;
obtaining one or more still images from a storage;

generating a moving image in which said obtained one or more still images are sequentially displayed; and in response to a request from a computer connected to a network, transmitting said generated moving image to a device external to the image distribution apparatus, and displaying said generated moving image on the external device;

accepting a print instruction from the external device, wherein said print instruction includes identification information identifying selected one or more still images among said one or more still images used for generating the moving image;

obtaining the selected one or more still images from the storage based on the identification information in the print instruction; and forming on one or more recording media said selected one or more still images obtained by the image formation control portion.

* * * * *